US012795438B2

(12) United States Patent
Wu et al.

(10) Patent No.: US 12,795,438 B2
(45) Date of Patent: Nov. 10, 2026

(54) AUTONOMOUS VEHICLE COMMUNICATION GATEWAY MANAGER

(71) Applicant: TuSimple, Inc., San Diego, CA (US)

(72) Inventors: Yuzhe Wu, San Diego, CA (US); Kuntong Xu, San Diego, CA (US); Changyi Zhao, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 452 days.

(21) Appl. No.: 18/427,941

(22) Filed: Jan. 31, 2024

(65) Prior Publication Data

US 2024/0267779 A1 Aug. 8, 2024

Related U.S. Application Data

(60) Provisional application No. 63/483,036, filed on Feb. 3, 2023, provisional application No. 63/483,033, filed on Feb. 3, 2023.

(51) Int. Cl.

| | |
|---|---|
| ***H04W 28/02*** | (2009.01) |
| ***B60W 50/04*** | (2006.01) |
| ***G05D 1/86*** | (2024.01) |
| ***G07C 5/00*** | (2006.01) |
| ***H04W 4/40*** | (2018.01) |
| ***H04W 24/08*** | (2009.01) |

(Continued)

(52) U.S. Cl.

CPC ...... *H04W 28/0268* (2013.01); *B60W 50/045* (2013.01); *G05D 1/86* (2024.01); *G07C 5/008* (2013.01); *H04W 4/40* (2018.02); *H04W 24/08* (2013.01); *B60W 2050/046* (2013.01); *B60W 2556/45* (2020.02); *G05D 2109/10* (2024.01); *G05D 2111/32* (2024.01)

(58) Field of Classification Search

None

See application file for complete search history.

(56) References Cited

U.S. PATENT DOCUMENTS

| | | | | |
|---|---|---|---|---|
| 9,488,979 | B1 * | 11/2016 | Chambers ............ | G05D 1/1064 |
| 10,459,441 | B2 | 10/2019 | Zhuang et al. | |
| 11,367,356 | B1 * | 6/2022 | Ketharaju ......... | B60W 60/0025 |

(Continued)

OTHER PUBLICATIONS

European Patent Office, Communication pursuant to Rule 62 EPC for EP Appl. No. 24155431.0, mailed on Jul. 2, 2024, 7 pgs.

*Primary Examiner* — Otis L Thompson, Jr.

(74) *Attorney, Agent, or Firm* — Ashurst Perkins Coie US LLP

(57) ABSTRACT

A system determines that an engine of an autonomous vehicle is ignited. In response, the system transitions the autonomous vehicle into an initiation state, during which Autonomous Vehicle Communication Gateway (AVCG) configuration data is received by the autonomous vehicle. When a particular time period passes after the ignition of the engine, the system transitions the autonomous vehicle into an active state, during which instructions provided by the AVCG configuration data are executed. If the engine of the autonomous vehicle is turned off, the system transitions the autonomous vehicle into a timed-active state, during which the system sends a rescue message to an oversight server. After a timeout parameter associated with the timed-active state is reached, the system transitions the autonomous vehicle into a shutdown state, during which results of the executed instructions are stored in a local memory.

20 Claims, 8 Drawing Sheets

(51) Int. Cl.
*G05D 109/10* (2024.01)
*G05D 111/30* (2024.01)

(56) References Cited

U.S. PATENT DOCUMENTS

| | | | | |
|---|---|---|---|---|
| 2013/0245857 | A1* | 9/2013 | Gariepy | G06F 1/26 701/2 |
| 2015/0339570 | A1* | 11/2015 | Scheffler | G06N 3/04 706/27 |
| 2018/0188727 | A1* | 7/2018 | Zhuang | B60W 60/001 |
| 2018/0215482 | A1* | 8/2018 | Zhang | B64U 10/14 |
| 2019/0135283 | A1 | 5/2019 | Bonk | |
| 2019/0238638 | A1* | 8/2019 | Way | H04L 67/12 |
| 2021/0304591 | A1* | 9/2021 | Small | G01C 21/3438 |
| 2022/0114893 | A1* | 4/2022 | Kim | G08G 1/14 |
| 2022/0126858 | A1* | 4/2022 | Liu | B60W 60/001 |
| 2022/0348227 | A1* | 11/2022 | Foster | B60Q 1/507 |
| 2023/0064124 | A1* | 3/2023 | Liu | B60W 50/14 |
| 2023/0073436 | A1* | 3/2023 | Kent | B60R 25/245 |
| 2023/0077561 | A1* | 3/2023 | Jackson | B60R 25/01 340/5.72 |
| 2023/0117967 | A1* | 4/2023 | Maruiwa | B60W 50/14 701/24 |
| 2023/0195103 | A1* | 6/2023 | Antonini | B64U 10/00 701/2 |
| 2023/0322242 | A1* | 10/2023 | Byun | B60W 60/0059 |

* cited by examiner

AUTONOMOUS VEHICLE COMMUNICATION GATEWAY MANAGER

PRIORITY

This application claims priority to U.S. Provisional Patent Application No. 63/483,033 filed Feb. 3, 2023, and titled "Autonomous Vehicle Communication Gateway Manager," and U.S. Provisional Patent Application No. 63/483,036 filed Feb. 3, 2023, and titled "Autonomous Vehicle Communication Gateway Agent," which are incorporated herein by reference.

TECHNICAL FIELD

The present disclosure relates generally to autonomous vehicles. More particularly, the present disclosure is related to an autonomous vehicle communication gateway manager.

BACKGROUND

One aim of autonomous vehicle technology is to provide vehicles that can safely navigate with limited or no driver assistance. The autonomous vehicle may be scheduled for a trip, prepared for the trip, and may start its journey toward a predetermined destination. While traveling on a road toward the predetermined destination, the autonomous vehicle may communicate different kinds of data to other systems.

SUMMARY

This disclosure recognizes various problems and previously unmet needs related to autonomous vehicle technology, and more specifically, the lack of a solution to improve the Quality of Service (QOS) of network traffic for the autonomous vehicles, reduce network congestions in data communications for the autonomous vehicles, and prioritize network traffic that is time-sensitive over other network traffic for the autonomous vehicles.

Certain embodiments of the present disclosure provide unique technical solutions to technical problems of current autonomous vehicle technology and network technology, including those problems described above, to improve autonomous vehicle technology and network technology. The practical applications and technical advantages provided by the disclosed system are described below.

Autonomous Vehicle Communication Gateway (AVCG) Manager

The present disclosure contemplates a system and method to implement an Autonomous Vehicle Communication Gateway (AVCG) manager that is configured to manage operations of the autonomous vehicle, including setting QoS for each network traffic based on a respective priority level of network traffic and implementing a particular set of finite state machine (FSM) states and particular trigger events (or conditions) to transition from one FSM state to another in response to a particular trigger event. The AVCG manager may be implemented in software resources.

In certain embodiments, the disclosed system may implement the particular set of FSM states and respective trigger events by the AVCG manager. For example, in response to detecting that an engine of the autonomous vehicle is ignited (or turned on), the disclosed system may cause the AVCG manager to transition into an initiation state. In other words, the disclosed system (e.g., via the AVCG manager) may cause the autonomous vehicle to operate in the initiation state. In the initiation state, the AVCG manager may receive AVCG configuration data. The AVCG configuration data may include a set of instructions to control the operations of the autonomous vehicle (and its components, such as a control device and the AVCG manager).

In another example, in response to detecting that a particular period has passed since the engine of the autonomous vehicle was ignited, the disclosed system may cause the AVCG manager to transition into an active state. In other words, the disclosed system (e.g., via the AVCG manager) may cause the autonomous vehicle to operate in the active state. While in the active state, the control device may execute one or more of the set of instructions indicated in the AVCG configuration data. For example, one of the instructions included in the AVCG configuration data may indicate to set QoS to each data flow (i.e., network traffic). The QoS may include network resources, such as bandwidths.

The control device may determine a priority level associated with each data flow and set an appropriate QoS to each data flow based on the determined priority level. For example, the control device may determine that a priority level associated with the location data of the autonomous vehicle is low because the location data is not time-sensitive and it does not change rapidly based on the speed of the autonomous vehicle. In response, the control device may allocate a particular amount of network resources (e.g., QOS) for the communication of the location data.

In another example, the control device may determine that a priority level associated with sensor data (e.g., an image feed showing an environment ahead of the autonomous vehicle) is high because the sensor data is time-sensitive. It may be determined that the sensor data is time-sensitive so that a proposed trajectory or command for the autonomous vehicle can be determined, finalized, and sent to the autonomous vehicle before the autonomous vehicle encounters a situation where it needs the command or the proposed trajectory. In response, the control device may prioritize the communication of the sensor data over other data communications, e.g., over communicating the location data. For example, the control device may allocate more network resources to communicating the sensor data compared to other data.

In this manner, the control device may prioritize the communication of network traffic associated with high priority levels (e.g., sensor data) over other network traffic with lesser priority levels (e.g., location data). Thus, the network utilization and network congestion at the control device is improved. For example, only the required amount of network resources is allocated to each data flow based on the respective priority level and QoS requirements of the respective data flow. Therefore, the appropriate amount of network resources is dedicated to each network communication. This leads to a reduction in the network latency of high-priority data communications, which, in turn, leads to improving the process of decision-making for determining or suggesting a navigation plan and/or a command for the autonomous vehicle and the network communications of the network device, and reducing the network latency for high-priority network communications. Accordingly, the disclosed system provides a practical application of reducing the network latency for high-priority network communications by prioritizing the communication of network traffic associated with high priority levels over other network traffic with lesser priority levels.

In another example, in response to detecting that the engine of the autonomous vehicle has turned off, the disclosed system may cause the AVCG manager to transition into a timed-active state. In other words, the disclosed system (e.g., via the AVCG manager) may cause the autonomous vehicle to operate in the timed-active state. For example, if the engine of the autonomous vehicle is unexpectedly turned off due to the autonomous vehicle being involved in an accident or otherwise having an impact with an object, the AVCG manager may cause the autonomous vehicle to operate in the timed-active state. In another example, the engine of the autonomous vehicle may be turned off due to a problem (e.g., mechanical and/or electrical) with the engine. Thus, the engine turning off issues may not be necessarily due to an accident/impact. While in the timed-active state, the control device may communicate a message to an oversight server. The message may be a rescue message that indicates the last determined location of the autonomous vehicle. Also, the AVCG manager may cause the control device to operate on a battery while in the timed-active state. Therefore, the control device may not have to rely on electrical power resources provided by the engine of the autonomous vehicle during the timed-active state. Accordingly, the disclosed system provides an additional practical application of detecting that the autonomous vehicle is involved in an accident (e.g., by detecting that the engine of the autonomous vehicle has turned off unexpectedly) and providing a solution for the autonomous vehicle to communicate a rescue message even when the engine of the autonomous vehicle is turned off (i.e., the engine no longer provides electrical power to other components) by causing the control device of the autonomous vehicle to operate on a battery to be able to be independent of the engine of the autonomous vehicle and send the rescue message.

In another example, in response to detecting that a timeout parameter associated with the timed-active state is reached the disclosed system may cause the AVCG manager to transition into a shutdown state. In other words, the disclosed system (e.g., via the AVCG manager) may cause the autonomous vehicle to operate in the shutdown state. The shutdown state may be referred to a state when the engine of the autonomous vehicle is turned off. While in the shutdown state, the control device may store the results of the executed instructions in the local memory.

In this manner, the disclosed system improves the underlying operations of the autonomous vehicle. In addition, the disclosed system provides a solution for cases when the engine of the autonomous vehicle 602 is unexpectedly turned off, e.g., due to an impact by an object in an accident while traveling on a road. In such cases, without the solution provided by the disclosed system, a rescue message is not sent to other remote systems that oversee the operations of the autonomous vehicle while the autonomous vehicle is in transit on roads. Therefore, the location of the autonomous vehicle may not be known to the remote systems and the autonomous vehicle may be stranded on the road. Accordingly, the disclosed system improves the autonomous vehicle technology and the underlying operations of the autonomous vehicle. This leads to providing safer driving conditions and experience for the autonomous vehicle, surrounding vehicles, and protecting pedestrians.

In certain embodiments, a system comprises a memory operably coupled to a gateway processor. The memory is configured to store an indication of a particular time period associated with an initiation state, the particular time period indicating a time when the initiation state ends. The processor is configured to determine that an engine of an autonomous vehicle was turned on at a first timestamp. In response to determining that the engine of the autonomous vehicle was turned on at the first timestamp, the processor causes the autonomous vehicle to operate in the initiation state. During the initiation state, AVCG configuration data is communicated to the autonomous vehicle. The AVCG configuration data comprises a set of instructions to control the operations of the autonomous vehicle. The processor determines that the particular time period has passed since the engine of the autonomous vehicle was turned on. In response to determining that the particular time period has passed since the engine of the autonomous vehicle was turned on, the processor causes the autonomous vehicle to operate in an active state. While in the active state, the processor executes at least one of the set of instructions. The processor determines that the engine of the autonomous vehicle is turned off at a second timestamp. In response to determining that the engine of the autonomous vehicle is turned off at the second timestamp, the processor causes the autonomous vehicle to operate in a timed-active state. The timed-active state is associated with a timeout parameter, such that when the timeout parameter is reached, the timed-active state ends. While in the timed-active state, the processor communicates a message to an oversight server. The processor determines that the timeout parameter is reached. In response to determining that the timeout parameter is reached, the processor causes the autonomous vehicle to operate in a shutdown state. While in the shutdown state, the processor stores a result of executing the at least one of the set of instructions in the memory.

AVCG Agent

The present disclosure contemplates a system and method to implement an AVCG agent that is generally configured to coordinate operations and communications of the AVCG manager with a control device that is onboard the autonomous vehicle. The AVCG agent may also be configured to detect changes in the autonomy status of the autonomous vehicle. For example, the AVCG agent may determine the autonomy status of the autonomous vehicle based on signals received from the control device associated with the autonomous vehicle. The autonomy status of the autonomous vehicle may indicate whether the autonomous vehicle is in autonomous mode, non-autonomous mode, or any other mode that can be contemplated for an autonomous vehicle.

The AVCG agent may receive AVCG information from the AVCG manager. The AVCG information may include information about the state in which the AVCG manager is operating. The state of the operation of the AVCG manager at any given time may be the initiation state, the active state, the timed-active state, or the shutdown state. The AVCG information may also include an indication indicating whether the AVCG manager is active, whether a time period of the initiation state is set, and whether each of the WIFI, Bluetooth, and other wireless communication protocols is active. The AVCG agent may also be configured to receive the autonomy status of the autonomous vehicle from the control device. The AVCG agent may determine whether there is a change in the autonomy status of the autonomous vehicle. In this operation, the AVCG agent may trace back through historical records of events that indicate historical operations executed with respect to the autonomous vehicle and determine one or more events that led to the change in the autonomy status of the autonomous vehicle.

In response to detecting the change in the autonomy status of the autonomous vehicle, the AVCG agent may determine the cause of the autonomy status change. For example, in some cases, a trajectory plan proposed for the autonomous vehicle may be an anomalous trajectory plan. In a particular example, assume that the autonomous vehicle is approaching a left turn, and a trajectory planning module proposed a trajectory plan is to make a sharp left turn which is not possible for the autonomous vehicle. In such cases of anomalous trajectory plans, the control device may determine that the autonomous vehicle cannot be navigated according to the proposed trajectory plan and change the autonomy status of the autonomous vehicle. In response, the AVCG agent may analyze and trace back through the historical records of events and determine that the cause of the change in the autonomy status is the anomalous trajectory plan.

In response to detecting the cause of the change in the autonomy status, the disclosed system may provide a solution to remedy the cause of the change in the autonomy status. For example, the disclosed system may debug the issue that caused the change in the autonomy status. In the example described above regarding the anomalous trajectory plan, the disclosed system may determine a reason why the trajectory planning module proposed the anomalous trajectory plan. For example, the disclosed system may determine that the reason for the anomalous trajectory plan may be out-of-date map data, or an out-of-date trajectory planning algorithm, among others. In response, the disclosed system may also update the map data, update the trajectory planning algorithm, and/or perform any suitable operation to debug the cause of the change in the autonomy status. In this manner, the disclosed system further provides improvements to the autonomous vehicle technology and to the navigation of autonomous vehicles. This leads to providing safer driving conditions and experience for the autonomous vehicle, surrounding vehicles, and protecting pedestrians.

In certain embodiments, a system comprises a memory operably coupled to a processor. The memory is configured to store historical records of events that provide information about the historical operations of an autonomous vehicle. The processor is configured to access Autonomous Vehicle Communication Gateway (AVCG) information that comprises information associated with an AVCG manager, wherein the AVCG manager is a software resource configured to transition among states in which the autonomous vehicle operates in response to detecting a respective trigger event. The processor determines an autonomy status associated with the autonomous vehicle, wherein the autonomy status indicates that the autonomous vehicle is in an autonomous mode, a non-autonomous mode, or a parking mode. The processor detects a change in the autonomy status. The processor determines a cause of the change in the autonomy status, wherein determining the cause of the change in the autonomy status comprises accessing the historical records of events, tracking back the historical records of events, tracking back the AVCG information, and determining one or more particular events from among one or both of the historical records of events and the AVCG information that led to the change in the autonomy status.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions to change the states of operations of an autonomous vehicle in response to respective trigger events and address a change in an autonomy status of the autonomous vehicle. The present disclosure provides various systems, methods, and devices to change the states of operations of an autonomous vehicle in response to respective trigger events and address (or remedy) a change in an autonomy status of the autonomous vehicle. Embodiments of the present disclosure and its advantages may be understood by referring to FIGS. 1 through 8. FIGS. 1 through 8 are used to describe systems and methods to change the states of operations of an autonomous vehicle in response to respective trigger events and address a change in an autonomy status of the autonomous vehicle.

System Overview

Figure 1:
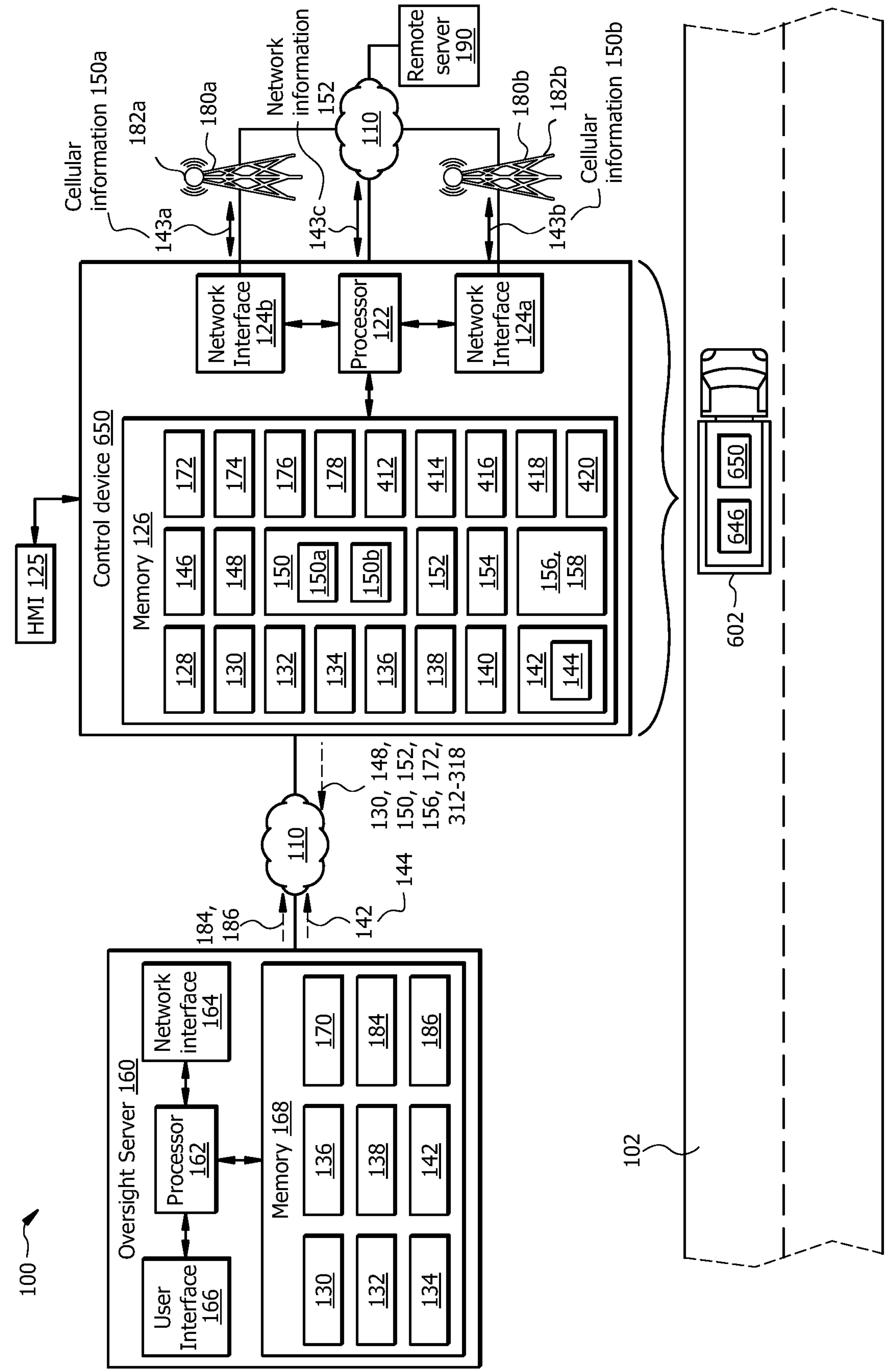
FIG. 1 illustrates an embodiment of a system configured to change the states of operations of an autonomous vehicle in response to respective trigger events and address a change in an autonomy status of the autonomous vehicle.

FIG. 1 illustrates an embodiment of a system 100 configured to change the states of operations of an autonomous vehicle 602 in response to respective trigger events and address (or remedy) a change in an autonomy status 414 of the autonomous vehicle 602. The operations of the system 100 to change states of operations of an autonomous vehicle 602 in response to respective trigger events are described in great details in the discussion of FIGS. 2 and 3. The operations of the system 100 to address (or remedy) a change in an autonomy status 414 of the autonomous vehicle 602 are described in great detail in the discussion of FIGS. 4 and 5.

FIG. 1 further illustrates a simplified schematic of a road 102 traveled by the autonomous vehicle(s) 602. In certain embodiments, the system 100 comprises an autonomous vehicle 602 that is communicatively coupled with an oversight server 160, one or more network providers 180*a-b*, one or more base stations 182*a-b*, and a remote server 190 via a network 110. Network 110 enables communications among the components of the system 100. For example, network 110 allows the autonomous vehicle 602 to communicate with other autonomous vehicles 602, systems, devices, oversight server 160, network providers 180*a-b*, base stations 182*a-b*, remote server 190, and the like. Network 110 also allows the oversight server 160, the network providers 180*a-b*, the base stations 182*a-b*, and the remote server 190 to communicate with the autonomous vehicle 602. The autonomous vehicle 602 comprises a control device 650 that generally facilitates the autonomous operations of the autonomous vehicle 602. The control device 650 comprises a gateway processor 122 in signal communication with a memory 126. Memory 126 stores software instructions 128 that when executed by the gateway processor 122 cause the control device 650 to perform one or more operations described herein. Memory 126 also stores Autonomous Vehicle Communication Gateway (AVCG) manager 140 that when executed by the gateway processor 122, cause the control device 650 to perform one or more operations described herein. Memory 126 also stores an AVCG agent 178 that when executed by the gateway processor 122, cause the control device 650 to perform one or more operations described herein. The oversight server 160 comprises a processor 162 in signal communication with a memory 168. Memory 168 stores software instructions 170 that when executed by the processor 162 cause the oversight server 160 to perform one or more operations described herein. In other embodiments, system 100 may not have all of the components listed and/or may have other elements instead of, or in addition to, those listed above. System 100 may be configured as shown or in any other configuration.

In general, the system 100 provides several practical applications and technical advantages that overcome the previously unmet technical problems in autonomous vehicle technology. The system 100 is configured to implement a particular set of finite state machine (FSM) states and particular trigger events (or conditions) to transition from one FSM state to another in response to a particular trigger event.

In certain embodiments, the system 100 may implement the particular set of FSM states 112 to 118 and respective trigger events in the AVCG manager 140. For example, in response to detecting that an engine of the autonomous vehicle 602 is ignited (or turned on), the system 100 (e.g., via the AVCG manager 140) may cause the AVCG manager 140 to transition into an initiation state 112. While in the initiation state 112, the AVCG manager 140 may receive AVCG configuration data 142. The AVCG configuration data 142 may include a set of instructions 144 to control the operations of the autonomous vehicle 602 (and its components, such as the control device 650 and the AVCG manager 140).

In another example, in response to detecting that a particular time period 146 has passed since the engine of the autonomous vehicle 602 was ignited, the system 100 (e.g., via the AVCG manager 140) may cause the AVCG manager 140 to transition into an active state 114. While in the active state 114, the control device 650 may execute one or more of the set of instructions indicated in the AVCG configuration data 142.

In another example, in response to detecting that the engine of the autonomous vehicle 602 has turned off, the system 100 (e.g., via the AVCG manager 140) may cause the AVCG manager 140 to transition into a timed-active state 116. For example, if the engine of the autonomous vehicle 602 is unexpectedly turned off due to the autonomous vehicle 602 being involved in an accident, or otherwise having an impact with an object, the AVCG manager 140 may cause the autonomous vehicle 602 to operate in the timed-active state 116. While in the timed-active state 116, the control device 650 may communicate a message to the oversight server 160. The message may be a rescue message that indicates the last determined location of the autonomous vehicle 602. Also, the AVCG manager 140 may cause the control device 650 to operate on a battery while in the timed-active state 116. Therefore, the control device 650 may not have to rely on electrical power resources provided by the engine of the autonomous vehicle 602 during the timed-active state 116.

In another example, in response to detecting that a timeout parameter associated with the timed-active state 116 is reached the system 100 (e.g., via the AVCG manager 140) may cause the AVCG manager 140 to transition into a shutdown state 118. While in the shutdown state 118, the control device 650 may store the results of the executed instructions 144 and the sensor data 130 captured by the sensors 646 of the autonomous vehicle 602 in the local memory 126. The stored data may be semi-persistent—meaning that historical records of the stored data can be accessed.

In this manner, the system 100 improves the underlying operations of the autonomous vehicle 602. In addition, the system 100 provides a solution for cases when the engine of the autonomous vehicle 602 is unexpectedly turned off, e.g., due to an impact by an object in an accident while traveling on a road. In such cases, without the solution provided by the system 100, a rescue message is not sent to other remote systems that oversee the operations of the autonomous vehicle while the autonomous vehicle is in transit on roads. Therefore, the location of the autonomous vehicle 602 may not be known to the remote systems and the autonomous vehicle may be stranded on the road. Accordingly, the system 100 improves the autonomous vehicle technology and the underlying operations of the autonomous vehicle. This leads to providing safer driving conditions and experience for the autonomous vehicle 602, surrounding vehicles, and protecting pedestrians.

The system 100 also provides the AVCG agent 178 that is configured to coordinate operations and communications of the AVCG manager 140 with other components of the autonomous vehicle 602, such as the processor 122 and the Human Machine Interface (HMI) 125. The AVCG agent 178 may also be configured to detect changes in autonomy status 414 of the autonomous vehicle 602. For example, the AVCG agent 178 may determine the autonomy status of the autonomous vehicle 602 based on signals received from the vehicle subsystems (640 in FIG. 6). The autonomy status of the autonomous vehicle 602 may indicate whether the autonomous vehicle 602 is in autonomous mode, non-autonomous mode, or any other mode that can be contemplated for an autonomous vehicle. The AVCG agent 178 may detect the change in the autonomy status of the autonomous vehicle 602 based on analyzing and tracing back through historical events 416 that occurred at the autonomous vehicle 602. In response to detecting the change in the autonomy status of the autonomous vehicle 602, the AVCG agent 178 may determine the cause of the autonomy status change. For example, in some cases, a trajectory plan proposed for the autonomous vehicle 602 may be an anomalous trajectory plan. In a particular example, assume that the autonomous vehicle 602 is approaching a left turn, and a trajectory planning module proposed a trajectory plan to make a sharp left turn which is not possible for the autonomous vehicle 602. In such cases of anomalous trajectory plans, the control device 650 may determine that the autonomous vehicle cannot be navigated according to the proposed trajectory plan and change the autonomy status of the autonomous vehicle 602. In response, the AVCG agent 178 may analyze and trace back through the historical records of events and determine that the cause of the change in the autonomy status is the anomalous trajectory plan.

In response to detecting the cause of the change in the autonomy status, the system 100 may provide a solution to remedy the cause of the change in the autonomy status 414. For example, the system 100 may debug the issue that caused the change in the autonomy status 414. In the example described above regarding the anomalous trajectory plan, the system 100 may determine a reason why the trajectory planning module proposed the anomalous trajectory plan. For example, the system 100 may determine that the reason for the anomalous trajectory plan may be out-of-date map data, or an out-of-date trajectory planning algorithm, among others.

In response, the system 100 may also update the map data, update the trajectory planning algorithm, and/or perform any suitable operation to address (e.g., debug) the cause of the change in the autonomy status. In this manner, the system 100 further provides improvements to the autonomous vehicle technology and to the navigation of the autonomous vehicles. This leads to providing safer driving conditions and safer traveling experience for the autonomous vehicle, surrounding vehicles, and a safer environment for pedestrians.

System Components

Network 110 may include any interconnecting system capable of transmitting audio, video, signals, data, messages, or any combination of the preceding. Network 110 may include all or a portion of a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network.

Example Autonomous Vehicle

Figure 6:
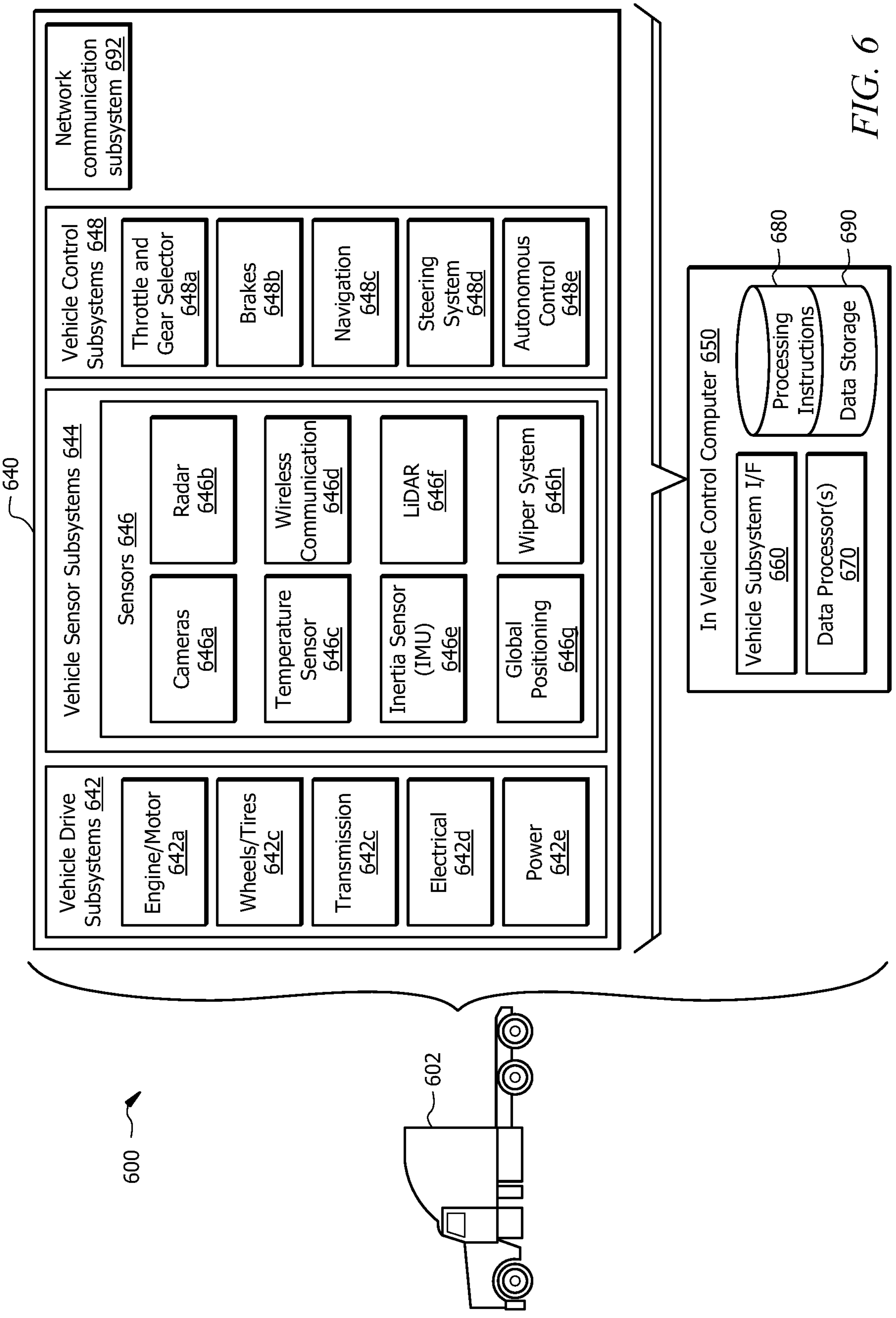
FIG. 6 illustrates a block diagram of an example autonomous vehicle configured to implement autonomous driving operations.

In certain embodiments, the autonomous vehicle 602 may include a semi-truck tractor unit attached to a trailer to transport cargo or freight from one location to another location (see FIG. 6). The autonomous vehicle 602 is generally configured to travel along a road in an autonomous mode. The autonomous vehicle 602 may navigate using a plurality of components described in detail in FIGS. 6-8. The operation of the autonomous vehicle 602 is described in greater detail in FIGS. 6-8. The corresponding description below includes brief descriptions of certain components of the autonomous vehicle 602.

Control device 650 may be generally configured to control the operation of the autonomous vehicle 602 and its components and to facilitate autonomous driving of the autonomous vehicle 602. The control device 650 may be further configured to determine a pathway in front of the autonomous vehicle 602 that is safe to travel and free of objects or obstacles, and navigate the autonomous vehicle 602 to travel in that pathway. This process is described in more detail in FIGS. 6-8. The control device 650 may generally include one or more computing devices in signal communication with other components of the autonomous vehicle 602 (see FIG. 6). In this disclosure, the control device 650 may interchangeably be referred to as an in-vehicle control computer 650.

The control device 650 may be configured to detect objects on and around a road traveled by the autonomous vehicle 602 by analyzing the sensor data 130 and/or map data 134. For example, the control device 650 may detect objects on and around the road by implementing object detection machine learning modules 132. The object detection machine learning modules 132 may be implemented using neural networks and/or machine learning algorithms for detecting objects from images, videos, infrared images, point clouds, audio feed, Radar data, etc. The object detection machine learning modules 132 are described in more detail further below. The control device 650 may receive sensor data 130 from the sensors 646 positioned on the autonomous vehicle 602 to determine a safe pathway to travel. The sensor data 130 may include data captured by the sensors 646.

Sensors 646 may be configured to capture any object within their detection zones or fields of view, such as landmarks, lane markers, lane boundaries, road boundaries, vehicles, pedestrians, road/traffic signs, among others. In some embodiments, the sensors 646 may be configured to detect rain, fog, snow, and/or any other weather condition. The sensors 646 may include a detection and ranging (LiDAR) sensor, a Radar sensor, a video camera, an infrared camera, an ultrasonic sensor system, a wind gust detection system, a microphone array, a thermocouple, a humidity sensor, a barometer, an inertial measurement unit, a positioning system, an infrared sensor, a motion sensor, a rain sensor, and the like. In some embodiments, the sensors 646 may be positioned around the autonomous vehicle 602 to capture the environment surrounding the autonomous vehicle 602. See the corresponding description of FIG. 3 for further description of the sensors 646.

Control Device

The control device 650 is described in greater detail in FIG. 6. In brief, the control device 650 may include the gateway processor 122 in signal communication with the memory 126 and network interfaces **124*a-b*. The gateway processor 122 may include one or more processing units that perform various functions as described herein. The memory 126 may store any data and/or instructions used by the gateway processor 122 to perform its functions. For example, the memory 126 may store software instructions 128 that when executed by the gateway processor 122 causes the control device 650** to perform one or more functions described herein.

The gateway processor 122 may be one of the data processors 670 described in FIG. 6. The gateway processor 122 comprises one or more processors. The gateway processor 122 may be any electronic circuitry, including state machines, one or more central processing unit (CPU) chips, logic units, cores (e.g., a multi-core processor), field-programmable gate arrays (FPGAs), application-specific integrated circuits (ASICs), or digital signal processors (DSPs). The gateway processor 122 may be a programmable logic device, a microcontroller, a microprocessor, or any suitable combination of the preceding. The gateway processor 122 may be communicatively coupled to and in signal communication with the network interface 124 and memory 126. The one or more processors may be configured to process data and may be implemented in hardware or software. For example, the gateway processor 122 may be 8-bit, 16-bit, 32-bit, 64-bit, or of any other suitable architecture. The gateway processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 128 to implement the functions disclosed herein, such as some or all of those described with respect to FIGS. 1-8. In some embodiments, the function described herein is implemented using logic units, FPGAs, ASICS, DSPs, or any other suitable hardware or electronic circuitry. For example, the gateway processor 122 may be configured to perform one or more operations of the operational flow of the system 100 described in FIG. 1, one or more operations of the operational flow 200 described in FIG. 2, one or more operations of the method 300 described in FIG. 3, one or more operations of the operational flow 400 described in FIG. 4, one or more operations of the method 500 described in FIG. 5, and one or more operations described in FIGS. 6-8.

Each of the network interfaces 124*a-b* may be a component of the network communication subsystem 692 described in FIG. 6. Each of the network interfaces 124*a-b* may be an instance of a network interface 124. Each of the network interfaces 124*a* and 124*b* may be configured to enable wired and/or wireless communications. Each of the network interfaces 124*a* and 124*b* may be configured to communicate data between the autonomous vehicle 602 and other devices, systems, or domains. For example, each of the network interfaces 124*a* and 124*b* may comprise a near-field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The gateway processor 122 may be configured to send and receive data using each of the network interfaces 124*a* and 124*b*. Each of the network interfaces 124*a* and 124*b* may be configured to use any suitable type of communication protocol as would be appreciated by one of ordinary skill in the art.

The first network interface 124*a* may be associated with and/or subscribed to the first network provider 180*a*. For example, the first network interface 124*a* may be provided with a first subscriber identity module (SIM) resource, that is associated with the first network provider 180*a*, when the global system for mobile communications (GSM) protocol is used by the first network provider 180*a*. The first SIM resource may be a SIM card, a physical SIM card, or an electronic SIM (e-SIM), among others, for example. In another example, the first network interface 124*a* may be subscribed to the first network provider 180*a* when the first network provider 180*a* unlocks communication protocols and channels for the first network interface 124*a*, when the code division multiple access (CDMA) protocol is used by the first network provider 180*a*.

The second network interface 124*b* may be associated with and/or subscribed to the second network provider 180*b*. For example, the second network interface 124*b* may be provided with a second SIM resource, that is associated with the second network provider 180*b*, when the GSM protocol is used by the second network provider 180*b*. The second SIM resource may be a SIM card, a physical SIM card, or an e-SIM, among others, for example. In another example, the second network interface 124*b* may be subscribed to the second network provider 180*b* when the second network provider 180*b* unlocks communication protocols and channels for the second network interface 124*b*, when the CDMA protocol is used by the second network provider 180*b*. Each of the first network provider 180*a* and the second network provider 180*b* may be a carrier provider that can use GSM, CDMA, fourth-generation (4G), fifth-generation (5G), New Radio (NR), Long term Evolution (LTE), etc. communication protocols.

The HMI 125 may include one or more user interfaces that are configured to interact with users. In certain embodiments, the HMI 125 may include a display screen, a camera, a microphone, a speaker, a keyboard, a mouse, a trackpad, a touchpad, etc. The HMI 125 may be configured to display data (such as the AVCG information 412 and any data stored in the memory 126) on the display screen. The control device 650 may be configured to display data associated with the autonomous vehicle 602 on the display screen included in the HMI 125. In certain embodiments, an instance of the HMI 125 may be located in a compartment that is accessible from outside of the autonomous vehicle 602. For example, one instance of the HMI 125 may be accessible from outside of the semi-truck tractor unit (i.e., cab) of the autonomous vehicle 602. In certain embodiments, an instance of the HMI 125 may be located inside the autonomous vehicle 602. For example, one instance of the HMI 125 may be accessible from within the cab of the autonomous vehicle 602.

The memory 126 may be one of the data storages 690 described in FIG. 6. The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc. The memory 126 may store any of the information described in FIGS. 1-8 along with any other data, instructions, logic, rules, or code operable to implement the function(s) described herein when executed by gateway processor 122. For example, the memory 126 may store software instructions 128, sensor data 130, object detection machine learning modules 132, map data 134, routing plan 136, driving instructions 138, AVCG manager 140, AVCG configuration data 142, particular time period 146, location data 148, cellular information 150, network information 152, network communication requirements 154, messages 156, 158, acknowledgment message 172, timeout parameter 174, results 176, AVCG agent 178, AVCG information 412, autonomy status 414, historical records of events 416, particular event(s) 418, operations 420, and/or any other data/instructions. The software instructions 128 include code that when executed by the gateway processor 122 causes the control device 650 to perform the functions described herein, such as some or all of those described in FIGS. 1-8. The memory 126 comprises one or more disks, tape drives, or solid-state drives, and may be used as an over-flow data storage device to store programs when such programs are selected for execution, and to store instructions and data that are read during program execution.

Object detection machine learning modules 132 may be implemented by the gateway processor 122 executing software instructions 128, and may be generally configured to detect objects and obstacles from the sensor data 130. The object detection machine learning modules 132 may be implemented using neural networks and/or machine learning algorithms for detecting objects from any data type, such as images, videos, infrared images, point clouds, audio feed, Radar data, etc.

In some embodiments, the object detection machine learning modules 132 may be implemented using machine learning algorithms, such as Support Vector Machine (SVM), Naive Bayes, Logistic Regression, k-Nearest Neighbors, Decision Trees, or the like. In some embodiments, the object detection machine learning modules 132 may utilize a plurality of neural network layers, convolutional neural network layers, Long-Short-Term-Memory (LSTM) layers, Bi-directional LSTM layers, recurrent neural network layers, and/or the like, in which weights and biases of these layers are optimized in the training process of the object detection machine learning modules 132. The object detection machine learning modules 132 may be trained by a training dataset that may include samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, audio feed, Radar data, etc. labeled with object(s) in each sample data. The object detection machine learning modules 132 may be trained, tested, and refined by the training dataset and the sensor data 130. The object detection machine learning modules 132 use the sensor data 130 (which are not labeled with objects) to increase their accuracy of predictions in detecting objects. Similar operations and embodiments may apply for training the object detection machine learning modules 132 using the training dataset that includes sound data samples each labeled with a respective sound source and a type of sound. For example, supervised and/or unsupervised machine learning algorithms may be used to validate the predictions of the object detection machine learning modules 132 in detecting objects in the sensor data 130.

Map data 134 may include a virtual map of a city or an area that includes the road traveled by an autonomous vehicle 602. In some examples, the map data 134 may include the map 758 and map database 736 (see FIG. 7 for descriptions of the map 758 and map database 736). The map data 134 may include drivable areas, such as roads, paths, highways, and undrivable areas, such as terrain (determined by the occupancy grid module 760, see FIG. 7 for descriptions of the occupancy grid module 760). The map data 134 may specify location coordinates of road signs, lanes, lane markings, lane boundaries, road boundaries, traffic lights, obstacles, etc.

Routing plan 136 may be a plan for traveling from a start location (e.g., a first autonomous vehicle launchpad/landing pad) to a destination (e.g., a second autonomous vehicle launchpad/landing pad). For example, the routing plan 136 may specify a combination of one or more streets, roads, and highways in a specific order from the start location to the destination. The routing plan 136 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 136 may include other information about the route from the start position to the destination, such as road/traffic signs in that routing plan 136, etc.

Figure 7:
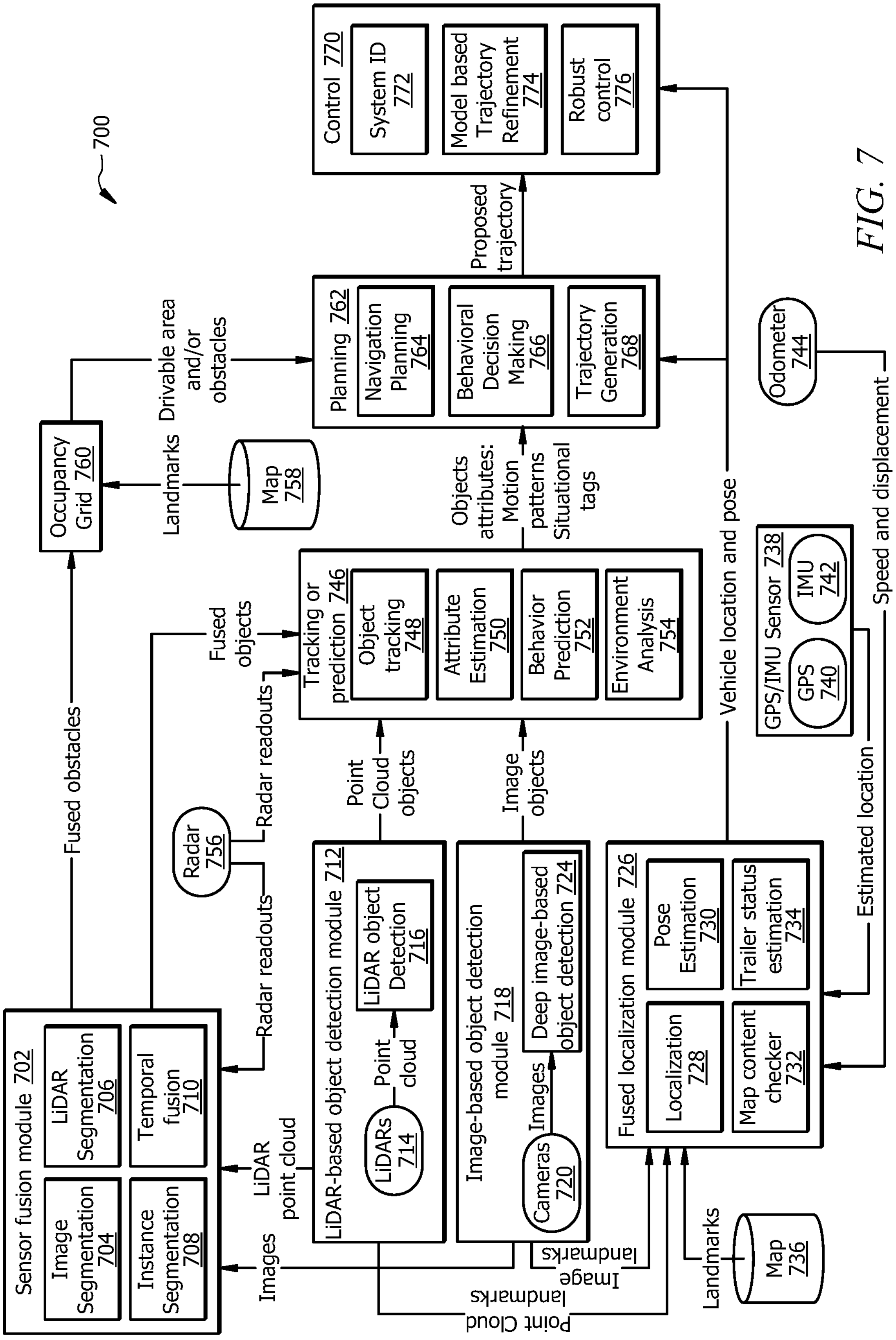
FIG. 7 illustrates an example system for providing autonomous driving operations used by the autonomous vehicle of FIG. 6.

Driving instructions 138 may be implemented by the planning module 762 (Sec descriptions of the planning module 762 in FIG. 7.). The driving instructions 138 may include instructions and rules to adapt the autonomous driving of the autonomous vehicle 602 according to the driving rules of each stage of the routing plan 136. For example, the driving instructions 138 may include instructions to stay within the speed range of a road traveled by the autonomous vehicle 602, adapt the speed of the autonomous vehicle 602 with respect to observed changes by the sensors 646, such as speeds of surrounding vehicles, objects within the detection zones of the sensors 646, etc.

The AVCG manager 140 may be a software instruction, code, or resource that when executed by the gateway processor 122, causes the control device 650 to execute one or more instructions described herein. The operations of the AVCG manager 140 are described in greater detail in the discussion of FIGS. 2 and 3. In the illustrated embodiment, the AVCG manager 140 is illustrated in the control device 650. In other embodiments, the AVCG manager 140 may be maintained in any computer system, such as an AVCG device. For example, the AVCG manager 140 may be maintained in the AVCG device (not explicitly shown) that is separate from the control device 650 and is decoupled from the autonomous navigation of the autonomous vehicle 602. In this way, the AVCG manager 140 may be deployed on any vehicle, such as non-autonomous vehicle, semi-autonomous vehicle, or autonomous vehicle.

The AVCG configuration data 142 may include a set of instructions 144 to control the operations of the autonomous vehicle 602. For example, the set of instructions 144 may indicate to set Quality of Service (QOS) to each data flow or network traffic based on a respective priority level of the network traffic. For example, if a particular data is time and/or delay sensitive, it may be associated with a higher priority level compared to other data. Thus, the particular data may be allocated with more QoS. The QoS may include particular network resources, such as network bandwidth, network channels, and signal strength. In the same or another example, the set of instructions 144 may also indicate to communicate acknowledgment message 172, location data 148, events (e.g., the selected network provider 180*a-b* for data communications, whether a network interface 124*a-b* is active, cellular information 150, network information 152, diagnostic results 176 of the executed instructions 144, etc.) to the oversight server 160.

The location data 148 may include a Global Positioning System (GPS) location coordinate of the autonomous vehicle 602 at a given location. The control device 650 may determine the location data 148 using a GPS sensor (646*g* in FIG. 6).

The cellular information 150 provides information about cellular connectivity coverage and conditions along a road 102 as the autonomous vehicle 602 travels along the road 102. In the illustrated example, the cellular information 150 includes cellular information 150*a* associated with a first network provider 180*a* and cellular information 150*b* associated with a second network provider 180*b*. In other examples, the cellular information 150 may include any number of cellular information 150 associated with any suitable number of network providers 180.

The cellular information 150*a* comprises information about cellular communication conditions and cellular coverage provided by the first network provider 180*a*. The cellular information 150*a* is determined based on cellular communication conditions determined from a communication path 143*a* with the base station 182*a*, where the communication path 143*a* is provided the first network provider 180*a*. The control device 650 (e.g., via the AVCG manager 140) determines the cellular information 150*a* based on the cellular network communications 143*a* with the serving base station 182*a* via the network interface 124*a*. The cellular information 150*a* may include a cellular signal bandwidth, a cellular signal strength, a cellular signal-to-noise ratio, a cellular signal-to-interference and noise ratio, a cellular data package loss rate, a cellular signal latency, a cellular signal round-trip time, a cellular signal bit rate, among other cellular signal measurements and characteristics associated with cellular connections via the network interface 124*a*.

The cellular information 150*b* comprises information about cellular communication conditions and cellular coverage provided by the second network provider 180*b*. The cellular information 150*b* is determined based on cellular communication conditions determined from a communication path 143*b* with the second network provider 180*b*, where the communication path 143*b* is provided by the network provider 180*b*. The control device 650 (e.g., via the AVCG manager 140) determines the cellular information 150*b* based on the cellular network communications 143*b* with the serving base station 182*b* via the network interface 124*b*. The cellular information 150*b* may include a cellular signal bandwidth, a cellular signal strength, a cellular signal-to-noise ratio, a cellular signal-to-interference and noise ratio, a cellular data package loss rate, a cellular signal latency, a cellular signal round-trip time, a cellular signal bit rate, among other cellular signal measurements and characteristics associated with cellular connections via the network interface 124*b*. Each cellular information 150*a-b* provides information about a one-hop cellular network communication between the control device 650 and a respective base station 182*a-b* that serves the control device 650. Each cellular information 150*a-b* may be associated with a respective network interface 124*a-b*, e.g., by the Internet Protocol (IP) address of the respective network interface 124*a-b*.

The network information 152 includes information about network connectivity coverage and conditions along a road 102 as the autonomous vehicle 602 travels along the road 102. The network information 152 may be with respect to end-to-end network communication between the control device 650 and the remote server 190 via multiple hops—meaning data routing among multiple access points, base stations, network devices, and the like that are along the network path connecting the control device 650 and the remote server 190. In other words, the network information 152 may be detected based on network communication path 143*c* between the control device 650 and the remote server 190. The network information 152 may be associated with communications according to one or more radio access technologies (RATs) comprising 4G, 5G NR, LTE, WIFI, and Bluetooth, among others. The network information 152 may include a network communication bandwidth, a network communication signal strength, a network communication signal-to-noise ratio, a network communication data package loss rate, a network communication latency, a network communication round-trip time, and a network communication signal bit rate, among other network measurements and conditions.

The network communication requirements 154 may be provided by the oversight server 160. The network communication requirements 154 may be configured by a remote operator, for example. The network communication requirements 154 may include a threshold network communication bandwidth, a threshold signal strength, a threshold signal-to-noise ratio, a threshold data package loss rate, a threshold latency, a threshold round-trip time, and a threshold signal bit rate among other cellular signal measurements and characteristics.

The AVCG agent 178 may be implemented in a software code that when executed by the control device 650, causes the control device 650 to execute one or more operations described herein. For example, when the AVCG agent 178 is executed, the control device 650 (e.g., via the AVCG agent 178) may access and display the AVCG information 412 on the HMI 125. In another example, when the AVCG agent 178 is executed, the control device 650 (e.g., via the AVCG agent 178) may determine an autonomy status 414 associated with the autonomous vehicle 602. In another example, when the AVCG agent 178 is executed, the control device 650 (e.g., via the AVCG agent 178) may determine whether there is any change in the autonomy status 414 of the autonomous vehicle 602, and in response to detecting a change in the autonomy status 414 of the autonomous vehicle 602, determine the cause of the detected change in the autonomy status 414. In another example, when the AVCG agent 178 is executed, the control device 650 may detect particular events 418 that led to the change in the autonomy status 414. In another example, when the AVCG agent 178 is executed, the control device 650 may perform operation(s) 420 to address (or remedy) the detected autonomy status change. The operations of the AVCG agent 178 are described in greater detail in the discussion of FIGS. 4 and 5.

The AVCG information 412 may include information about the AVCG manager 140. For example, the AVCG information 412 associated with the AVCG manager 140 may include the status of the AVCG manager 140, such as whether the AVCG manager 140 is active or inactive, the state 112-118 in which the AVCG manager 140 currently operates as indicated by the AVCG manager 140, an indication indicating whether the timeout parameter 174 is reached since the AVCG manager 140 is operating in the timed-active state 116, an indication indicating whether the particular time period 146 is reached since the AVCG manager 140 is operating in the initiation state 112. The timeout parameter 174 may be a threshold time period.

The AVCG information 412 may include information associated with network providers 180*a-b*, including the cellular information 150*a-b*. The AVCG information 412 may also include information about which network provider 180*a-b* is selected for data communications of the autonomous vehicle 602. For example, a particular network provider 180*a-b* out of the network providers 180*a-b* may be selected for data communications of the autonomous vehicle 602 if it is determined that the particular network provider 180*a-b* provides a more optimal network and cellular coverage compared to the other network provider. In other words, the control device 650 (e.g., via the AVCG manager 140) may dynamically switch between the network providers 180*a-b*. This operation is described in greater detail further below.

The AVCG information 412 may include information associated with network communication protocols, including WIFI, Bluetooth, 5G, 4G, etc. For example, the AVCG information 412 may include an indication indicating whether the WIFI connection is active (e.g., switched on for data communications or operational) at the autonomous vehicle 602, an indication indicating whether the Bluetooth connection is active (or switched on for data communications or operational) at the autonomous vehicle 602, an indication indicating whether the 5G connection is active (or switched on for data communications or operational) at the autonomous vehicle 602, among others. The AVCG information 412 may also include information about access to the AVCG manager 140, e.g., by a remote operator. For example, the AVCG information 412 may include records of access to the AVCG manager 140, such as timestamps, among others.

Oversight Server

Oversight server 160 may include one or more processing devices and is generally configured to oversee the operations of the autonomous vehicle 602 while they are in transit and oversee the traveling of the autonomous vehicle 602 and while they are at a terminal. The oversight server 160 may provide software and/or hardware resources (e.g., map data 134, routing plans 136, AVCG configuration data 142, routing recommendations, feedback from a remote operator on autonomous vehicle navigation, etc.) to the autonomous vehicles 602. The oversight server 160 may comprise a processor 162, a network interface 164, a user interface 166, and a memory 168. The components of the oversight server 160 are operably coupled with each other. The processor 162 may include one or more processing units that perform various functions of the oversight server 160. The memory 168 may store any data and/or instructions used by the processor 162 to perform its functions. For example, the memory 168 may store software instructions 170 that when executed by the processor 162 cause the oversight server 160 to perform one or more functions described herein. The oversight server 160 may be configured as shown or in any other suitable configuration.

In one embodiment, the oversight server 160 may be implemented by a cluster of computing devices that may serve to oversee the operations of the autonomous vehicle 602. For example, the oversight server 160 may be implemented by a plurality of computing devices using distributed computing and/or cloud computing systems. In another example, the oversight server 160 may be implemented by a plurality of computing devices in one or more data centers. As such, in one embodiment, the oversight server 160 may include more processing power than the control device 650. The oversight server 160 is in signal communication with the autonomous vehicle 602 and its components (e.g., the control device 650).

Processor 162 comprises one or more processors. The processor 162 may be any electronic circuitry, including state machines, one or more CPU chips, logic units, cores (e.g., a multi-core processor), FPGAs, ASICs, or DSPs. The processor 162 may be a programmable logic device, a microcontroller, a microprocessor, or any suitable combination of the preceding. The processor 162 may be communicatively coupled to and in signal communication with the network interface 164, user interface 166, and memory 168. The one or more processors are configured to process data and may be implemented in hardware or software. For example, the processor 162 may be 8-bit, 16-bit, 32-bit, 64-bit or of any other suitable architecture. The processor 162 may include an ALU for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 170 to implement the functions disclosed herein, such as some or all of those described with respect to FIGS. 1-8. In some embodiments, the function described herein may be implemented using logic units, FPGAs, ASICs, DSPs, or any other suitable hardware or electronic circuitry. For example, the processor 162 may perform one or more operations of the operational flow of the system 100 described in FIG. 1, one or more operations of the operational flow 200 described in FIG. 2, one or more operations of the method 300 described in FIG. 3, one or more operations of the operational flow 400 described in FIG. 4, and/or one or more operations of the method 500 described in FIG. 5.

Network interface 164 may be configured to enable wired and/or wireless communications of the oversight server 160. The network interface 164 may be configured to communicate data between the oversight server 160 and other devices, servers, autonomous vehicles 602, systems, or domains. For example, the network interface 164 may comprise an NFC interface, a Bluetooth interface, a Zigbee interface, a Z-wave interface, an RFID interface, a WIFI interface, a LAN interface, a WAN interface, a PAN interface, a modem, a switch, and/or a router. The processor 162 may be configured to send and receive data using the network interface 164. The network interface 164 may be configured to use any suitable type of communication protocol as would be appreciated by one of ordinary skill in the art.

User interfaces 166 may include one or more user interfaces that are configured to interact with users, such as a remote operator. The remote operator may access the oversight server 160 directly or via a network communication path. In certain embodiments, the user interfaces 166 may include peripherals of the oversight server 160, such as monitors, keyboards, mouse, trackpads, touchpads, microphones, webcams, speakers, and the like. In certain embodiments, the user interface 166 may include a graphical user interface, a software application, or a web application. The remote operator may use the user interfaces 166 to access the memory 168 to review any data stored in the memory 168. The remote operator may confirm, update, and/or override the routing plan 136, map data 134, AVCG configuration data 142, and/or any other data stored in memory 168.

Memory 168 may be volatile or non-volatile and may comprise ROM, RAM, TCAM, DRAM, and SRAM. The memory 168 may include one or more of a local database, cloud database, NAS, etc. Memory 168 may store any of the information described in FIGS. 1-8 along with any other data, instructions, logic, rules, or code operable to implement the function(s) described herein when executed by processor 162. For example, the memory 168 may store software instructions 170, sensor data 130, object detection machine learning module 132, map data 134, routing plan 136, driving instructions 138, AVCG configuration data 142, and/or any other data/instructions. The software instructions 170 may include code that when executed by the processor 162 causes the oversight server 160 to perform the functions described herein, such as some or all of those described in FIGS. 1-8. The memory 168 comprises one or more disks, tape drives, or solid-state drives, and may be used as an over-flow data storage device, to store programs when such programs are selected for execution, and to store instructions and data that are read during program execution. Other data stored in the memory 168 are described in other sections of the present disclosure.

Base Station

Each of the base stations 182*a* and 182*b* may be a network node, an access point, an NB, an eNB, eNodeB, gNB, or other types of wireless access points, and is generally configured to enable wireless communication between the components of the system 100. Each of the base stations

182*a* and 182*b* may serve communications to devices within a serving cell that defines a corresponding coverage area of the serving cell. Each of the network providers 180*a* and 180*b* may be an instance of a network provider 180. The network provider 180 may be an entity that provides network communication channels to its subscribers.

Each of the base stations 182*a* and 182*b* may be a serving base station for vehicles equipped with wireless communication (such as autonomous vehicles 602, non-autonomous vehicles equipped with the AVCG manager 140 and/or a network interface 124, semi-autonomous vehicles equipped with the AVCG manager 140 and/or a network interface 124*a-b*, etc.), user devices, mobile devices, and the like. When a vehicle is within a coverage area associated with a particular base station 182*a-b*, the base station 182*a-b* provides communication coverage to the vehicle. For example, as a vehicle travels along the road 102, its communication device (e.g., network interface 124*a-b*) may communicate data to its respective serving base station 182*a-b*. As the vehicle travels between cells, base stations 182*a*, and *b* perform the handover procedure to hand over facilitating the communication of the communication device associated with the vehicle. In certain embodiments, each of the base stations 182*a* and 182*b* may be configured to facilitate cellular networks, 4G, 5G, 5G NR, LTE, 3rd Generation Partnership Project (3GPP), and other wireless protocols.

In certain embodiments, each base station 182*a-b* may also include a transceiver, a transmission filter, a receiving filter, memory resources, and processing resources to facilitate operations of each base station 182*a-b*, such as to transmit and receive cellular signals, network signals, mobile communication signals, and/or any other signals. For example, the transceiver may include a processing circuitry configured to transmit signals to mobile devices, control devices 650, other base stations, and to other communication systems to enable mobile communication and access to the network 110. The transmission filter includes a bandpass filter with a strict passband. The passband corresponds to the bandwidth that is assigned for the base station 182*a-b*. Any signals with frequencies outside the passband are filtered so that they are not transmitted from the base station 182*a-b*. The receiving filter includes a bandpass filter configured to ensure that the base station 182*a-b* will reject any signals outside of its designated bandwidth. Accordingly, the receiving filter is a bandpass filter with a strict bandpass corresponding to the assigned bandwidth of the base station 182*a-b*. The memory resources include one or more computer-readable media that store software instructions for establishing a communication network with the base station 182*a-b*. The processing resources may include one or more processing circuitry configured to execute the software instructions stored in the one or more computer-readable media of the memory resources to perform wireless communication functions of the base station 182*a-b*.

Remote Server

The remote server 190 is generally a device that is configured to provide software and/or hardware resources to other components of the system 100. In certain embodiments, the remote server 190 may be in a cloud platform in a remote server farm. In certain embodiments, the remote server 190 may be in a remote data center. The remote server 190 may be a database server or a network server configured to return messages (e.g., acknowledgment messages) to the control device 650 in response to receiving a data package requesting to return an acknowledgment message. Based on the network communication path 143*c* between the control device 650 and the remote server 190, the control device 650 may determine the network information 152. For example, the control device 650 may determine a round-trip time included in the network information 152, where the round-trip time is the time from when the control device 650 transmits a data package requesting an acknowledgment message to the remote server 190 until the acknowledgment message is received at the control device 650.

AVCG Manager and its Operations

Figure 2:
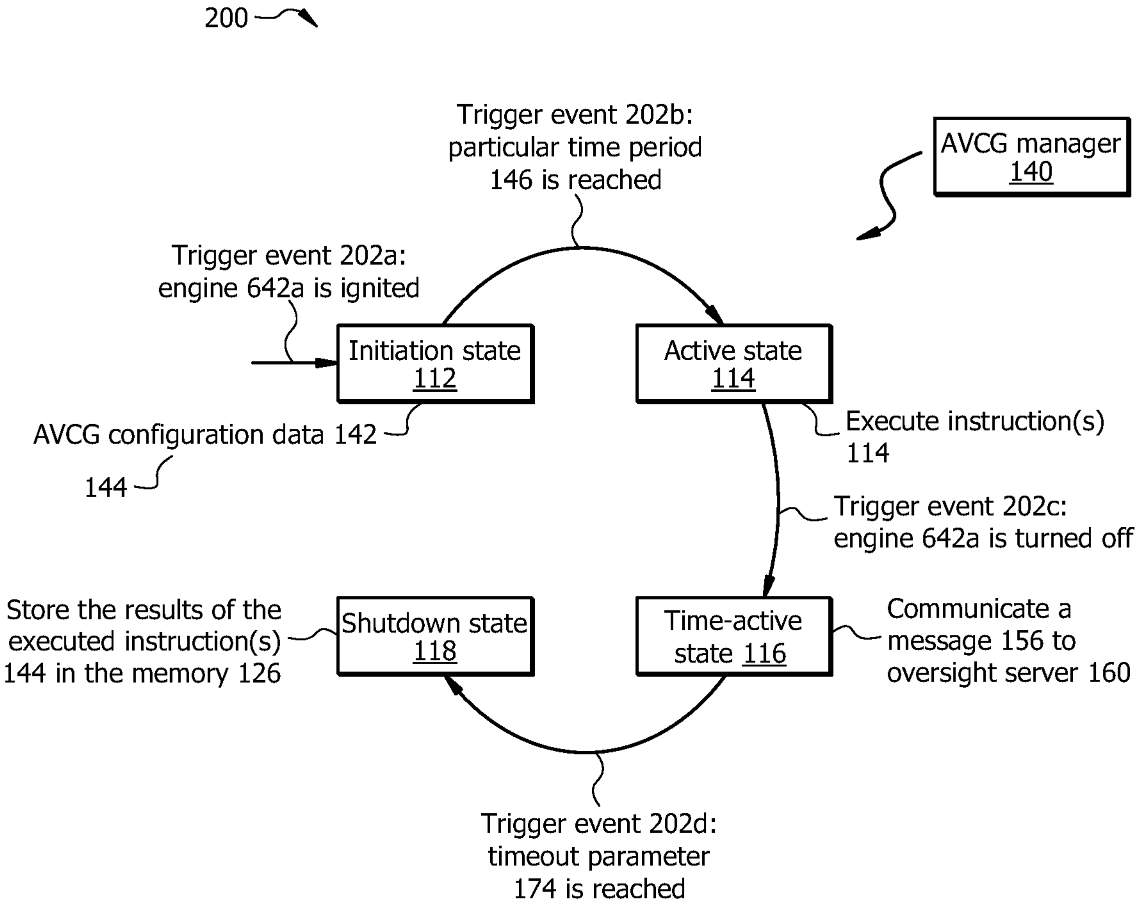
FIG. 2 illustrates an example operational flow of the system of FIG. 1 for changing states of operations of an autonomous vehicle in response to respective trigger events.

FIG. 2 illustrates an example operational flow 200 of the system 100 (see FIG. 1) to implement the AVCG manager 140 and its operations, including changing the states 112-18 of operations in response to respective trigger events 202*a-d*. The example operational flow 200 of the system 100 (see FIG. 1) may describe implementing trigger-based state transitions based on particular trigger events 202*a-d*. In certain embodiments, the AVCG manager 140 may be configured to transition from one state 112-118 to another state 112-118 in response to detecting respective trigger events 202*a-d*. For example, when the AVCG manager 140 is executed by the control device 650, the AVCG manager 140 causes the control device 650 to change from one state to another state in response to detecting respective trigger events, and perform one or more operations as indicated in the AVCG configuration data 142 in each state. In certain embodiments, the trigger events 202*a-d* may be based on the status of the engine (642*a* in FIG. 6) of the autonomous vehicle 602. In certain embodiments, the trigger events 202*a-d* may be based on one or more of the locations of the autonomous vehicle 602, the health status of the autonomous vehicle 602, among others. In an example scenario, assume that an autonomous vehicle 602 is scheduled to make a trip from a launch pad (e.g., in a first terminal on the map data 134) to a landing pad (i.e., a second terminal on the map data 134.

Transitioning to an Initiation State

While the autonomous vehicle 602 is in the launch pad before the trip or pre-trip inspection begins, the autonomous vehicle 602's engine may be turned off. The engine of the autonomous vehicle 602 may be ignited or turned on to start preparing the autonomous vehicle 602 for the trip, perform pre-trip inspection, etc. The control device 650 may determine whether or not the engine of the autonomous vehicle 602 is turned off. In response to determining that the engine of the autonomous vehicle 602 is turned on (e.g., at a first timestamp), the control device 650 (e.g., via the AVCG manager 140) may cause the AVCG manager 140 to transition into the initiation state 112. In other words, the control device 650 (e.g., via the AVCG manager 140) may cause the autonomous vehicle 602 to operate in the initiation state 112. Therefore, the trigger event 202*a* that causes the transition to the initiation state 112 may be detecting that the engine of the autonomous vehicle 602 is turned on. While in the initiation state 112, the oversight server 160 may communicate the AVCG configuration data 142 to the control device 650 while the autonomous vehicle 602 operates in the initiation state 112. In response, the control device 650 may receive the AVCG configuration data.

In certain embodiments, the initiation state 112 may be associated with a particular time period 146. The particular time period 146 may be configured by a remote operator who has access to the oversight server 160. The particular time period 146 may be included in the AVCG configuration data 142. The control device 650 (e.g., via the AVCG manager 140) may determine whether the particular time period 146 has passed since the engine of the autonomous vehicle 602 is turned on (i.e., since the autonomous vehicle 602 is transitioned into the initiation state 112). For example, the control device 650 (e.g., via the AVCG manager 140) may start a counter when the engine of the autonomous vehicle 602 is turned on.

Transitioning to the Active State

In response to determining that the particular time period 146 has passed since the engine of the autonomous vehicle 602 was turned on, the control device 650 (e.g., via the AVCG manager 140) may cause the AVCG manager 140 to transition into the active state 114. In other words, the control device 650 (e.g., via the AVCG manager 140) may cause the autonomous vehicle 602 to operate in the active state 114. While in the active state 114, the control device 650 (e.g., via the AVCG manager 140) may perform one or more operations. For example, the control device 650 (e.g., via the AVCG manager 140) may execute one or more instructions 144 that are indicated in the AVCG configuration data 142. In one example, the control device 650 may set a particular QoS for each data flow or network path based on the respective priority level of each data flow. For example, the control device 650 (e.g., via the AVCG manager 140) may determine a priority level of each data flow based on a priority level tag that is associated with each data flow. For example, the priority level tag associated with location data 148 may indicate that the priority level of location data 148 may be low (i.e., less than a threshold priority level (e.g., less than 5 out of 10)) because the location data 148 may not be time-sensitive and/or does not require to be transmitted in real-time and/or does not change rapidly due to the speed of the autonomous vehicle 602. Therefore, when communicating the location data 148 to the oversight server 160, the control device 650 (e.g., via the AVCG manager 140) may determine that the priority level of the location data 148 is low. In response, the control device 650 (e.g., via the AVCG manager 140) may set a first QoS that is less than a threshold QoS (e.g., less than 5 out of 10 QoS level) to a first data flow (i.e., network path) for communicating the location data 148. In other words, the control device 650 may allocate fewer network resources to the first data flow for the communication of the location data 148 based on the low priority level of the location data 148 130 compared to other data flows. The control device 650 (e.g., via the AVCG manager 140) may allocate a particular amount of network resources that is enough to satisfy the required QoS for communicating the location data 148 without allocating more than what is required. The network resources may include network bandwidth, signal strength, and network channels. In this manner, the control device 650 may prioritize other network traffic that has a higher priority higher than the location data 148 over the location data 148.

In another example, the priority level tag associated with sensor data 130 (e.g., an image of an environment ahead of the autonomous vehicle 602) may indicate that the priority level of the sensor data 130 may be high (i.e., more than the threshold priority level, e.g., more than 5 out of 10) because the size of the sensor data 130 is larger than a threshold (e.g., more than one gigabyte (Gb)) and/or required to be transmitted in real-time (or within an acceptable latency) to provide information about the environment ahead of the autonomous vehicle so that a more accurate decision can be made for the navigation of the autonomous vehicle. Therefore, the communication of the sensor data 130 may be time-sensitive. Thus, when communicating the sensor data 130 to the oversight server 160, the control device 650 (e.g., via the AVCG manager 140) may determine that the priority level of the sensor data 130 is high. In response, the control device 650 (e.g., via the AVCG manager 140) may set a second QoS to a second data flow (i.e., network path) that is more than the threshold QoS for the communication of the sensor data 130. In other words, the control device 650 may allocate more network resources to the second data flow for the communication of the sensor data 130 based on the high priority level of the sensor data 130 compared to other data flows.

In this manner, the control device 650 may prioritize the communication of network traffic associated with high priority levels (e.g., sensor data 130) over other network traffic with lesser priority levels (e.g., location data 148). Thus, the network utilization at the control device 650 is improved. For example, only the required amount of network resources is allocated to each data flow based on the respective priority level and QoS requirements of the respective data flow. Therefore, the appropriate amount of network resources is dedicated to each network communication. This leads to a reduction in the network latency of high-priority data communications, which, in turn, leads to improving the process of decision making for determining or suggesting a navigation plan and/or a command for the autonomous vehicle and the network communications of the control device 650.

In another example, another instruction 144 may indicate to select a particular network provider 180 from among a plurality of network providers 180*a-b* to use for data communications of the control device 650. For example, the control device 650 (e.g., via the AVCG manager 140) may detect acellular information 150*a-b*. The control device 650 (e.g., via the AVCG manager 140) may communicate the cellular information 150*a-b* to the oversight server 160, similar to that described in FIG. 1. The oversight server 160 (and/or a remote operator) may analyze the cellular information 150*a-b* and determine which network provider 180*a-b* provides a more optimal cellular coverage along the road 102 where the autonomous vehicle 602 is traveling based on the cellular information 150*a-b* and network information 152.

The oversight server 160 may determine a particular cellular information 150*a-b* that comprises network conditions and measurements that satisfy the network communication requirements 154. For example, the first network provider 180*a* may be selected over the second network provider 180*b* based on determining that the first cellular information 150*a* comprises network conditions that satisfy the network communication requirements 154, and that the second cellular information 150*b* comprises network conditions that do not satisfy the network communication requirements 154.

The oversight server 160 (and/or the remote operator) may include in the AVCG configuration data 142 to select the particular network provider 180*a-b* that is determined to provide a more optimal cellular coverage along the road 102 where the autonomous vehicle 602 is traveling. In response to receiving the AVCG configuration data 142, the control device 650 (e.g., via the AVCG manager 140) may select the particular network provider 180*a-b* as indicated in the AVCG configuration data 142. The control device 650 (e.g., via the AVCG manager 140) may also communicate a message that indicates the selected network provider 180*a-b* to the oversight server 160. In this manner, dynamic switching between the network providers 180*a-b* may be performed.

In certain embodiments, the operations of determining which network provider 180*a-b* provides a more optimal cellular coverage along the road 102, selecting a particular network provider 180*a-b* that is determined to provide a more optimal cellular coverage along the road 102, and dynamically switching between the network providers

180*a-b* may be performed by the control device 650. In certain embodiments, these operations may be performed by the oversight server 160.

In another example, another instruction 144 may indicate to communicate a message that includes the cellular information 150*a-b* detected from communications with base stations of the network providers 180*a-b* and network information 152 detected from communications with the remote server 190. In another example, another instruction 144 may indicate to cause the control device 650 to operate on a battery when the autonomous vehicle 602 transitions into the timed-active state 116. In another example, another instruction 144 may indicate to communicate an acknowledgment message 172 that indicates the autonomous vehicle 602 (and AVCG manager 140) is operational and operating in autonomy mode to the oversight server 160. In another example, another instruction 144 may indicate to communicate location data 148 to the oversight server 160 at particular intervals, e.g., every second, every thirty seconds, every minute, or any suitable interval. In another example, another instruction 144 may indicate to communicate a message that indicates events, such as which network interface(s) 124 is active or which is inactive, e.g., whether each of WIFI, Bluetooth, LAN, interfaces is active or inactive, changes in the configurations of the AVCG manager 140 as indicated in the AVCG configuration data 142 (if any), switches between the network interfaces 124*a-b*, among other events. In another example, another instruction 144 may indicate to communicate diagnostic results 176 of instructions 144 executed for determining the health status of various components of the autonomous vehicle 602 to the oversight server 160. Each diagnostic result 176 associated with a particular component of the autonomous vehicle 602 may indicate whether the particular component is operational and active, and indicate the performance of the particular component.

In certain embodiments, the control device 650 may receive particular set of data from the oversight server 160 while in the active state 114. For example, the oversight server 160 may communicate a command 184 that indicates to execute the one or more instructions 144 to the control device 650. In response, control device 650 may execute the one or more instructions 144. In another example, the oversight server 160 may communicate a command 184 that indicates to execute a minimal risk condition (MRC) maneuver to the control device 650. In response, the control device 650 may execute the MRC maneuver command. The MRC maneuver may include pulling over, stopping, operating in a degraded mode (e.g., with reduced speed and increased distance from surrounding objects and vehicles). In another example, the oversight server 160 may communicate an acknowledgment message 186 to the control device 650, where the acknowledgment message 186 may indicate that the oversight server 160 is operational and active. In another example, the oversight server 160 may communicate diagnostic procedures (i.e., diagnostics instructions 144) to be executed on various components of the autonomous vehicle 602 to the control device 650. The diagnostic instructions 144 may include code that when executed on a component of the autonomous vehicle 602, the operations of the component are tested.

Transitioning to the Timed-Active State

Continuing the example above, when the engine of the autonomous vehicle 602 is turned off (e.g., at a second timestamp), the control device 650 (e.g., via the AVCG manager 140) may detect this event. In response, the control device 650 (e.g., via the AVCG manager 140) may cause the AVCG manager 140 to transition into a timed-active state 116. In other words, the control device 650 (e.g., via the AVCG manager 140) may cause the autonomous vehicle 602 to operate in the timed-active state 116. The timed-active state 116 may be associated with a timeout parameter 174, such that when the timeout parameter 174 is reached, the timed-active state 116 ends.

While operating in the timed-active state 116, the control device 650 (e.g., via the AVCG manager 140) may communicate a message 156 to the oversight server 160. The message 156 may be a rescue message that indicates the last determined location of the autonomous vehicle 602, for example. The message 156 may also indicate to dispatch a driver, a service provider, and/or emergency personnel to the location of the autonomous vehicle 602. For example, if the engine of the autonomous vehicle 602 is unexpectedly turned off due to the autonomous vehicle 602 being involved in an accident, or otherwise having an impact with an object, the AVCG manager 140 may cause the autonomous vehicle 602 to operate in the timed-active state 116. In the timed-active state 116, the control device 650 may communicate a rescue message 156 that indicates the last determined location of the autonomous vehicle 602 to the oversight server 160 and that the autonomous vehicle 602 is involved in an accident. Also, the AVCG manager 140 may cause the control device 650 to operate on a battery while in the timed-active state 116. Therefore, the control device 650 may not have to rely on electrical power resources provided by the engine of the autonomous vehicle 602 during the timed-active state 116.

Transitioning to a Shutdown State

Continuing the example above, when the control device 650 determines that the timeout parameter 174 is reached since the engine of the autonomous vehicle 602 is turned off, the control device 650 (e.g., via the AVCG manager 140) may cause the AVCG manager to transition into the shutdown state 118. In other words, the control device 650 (e.g., via the AVCG manager 140) may cause the autonomous vehicle 602 to operate in the shutdown state 118.

While in the shutdown state 118, the control device 650 (e.g., via the AVCG manager 140) may store the results 176 of the executed instructions 144 in the local memory 126. The results 176 of the executed instructions 144 may include a trajectory of the autonomous vehicle 602, the health status of various components of the autonomous vehicle 602, the selected network provider for data communications of the autonomous vehicle 602, the activation status of network interfaces (e.g., WIFI, Bluetooth, LAN, etc.), diagnostic results of test instructions on various components of the autonomous vehicle 602, among others. The control device 650 (e.g., via the AVCG manager 140) may also store other data in the memory 126, including the sensor data 130, location data 148, cellular information 150, and network information 152.

Figure 3:
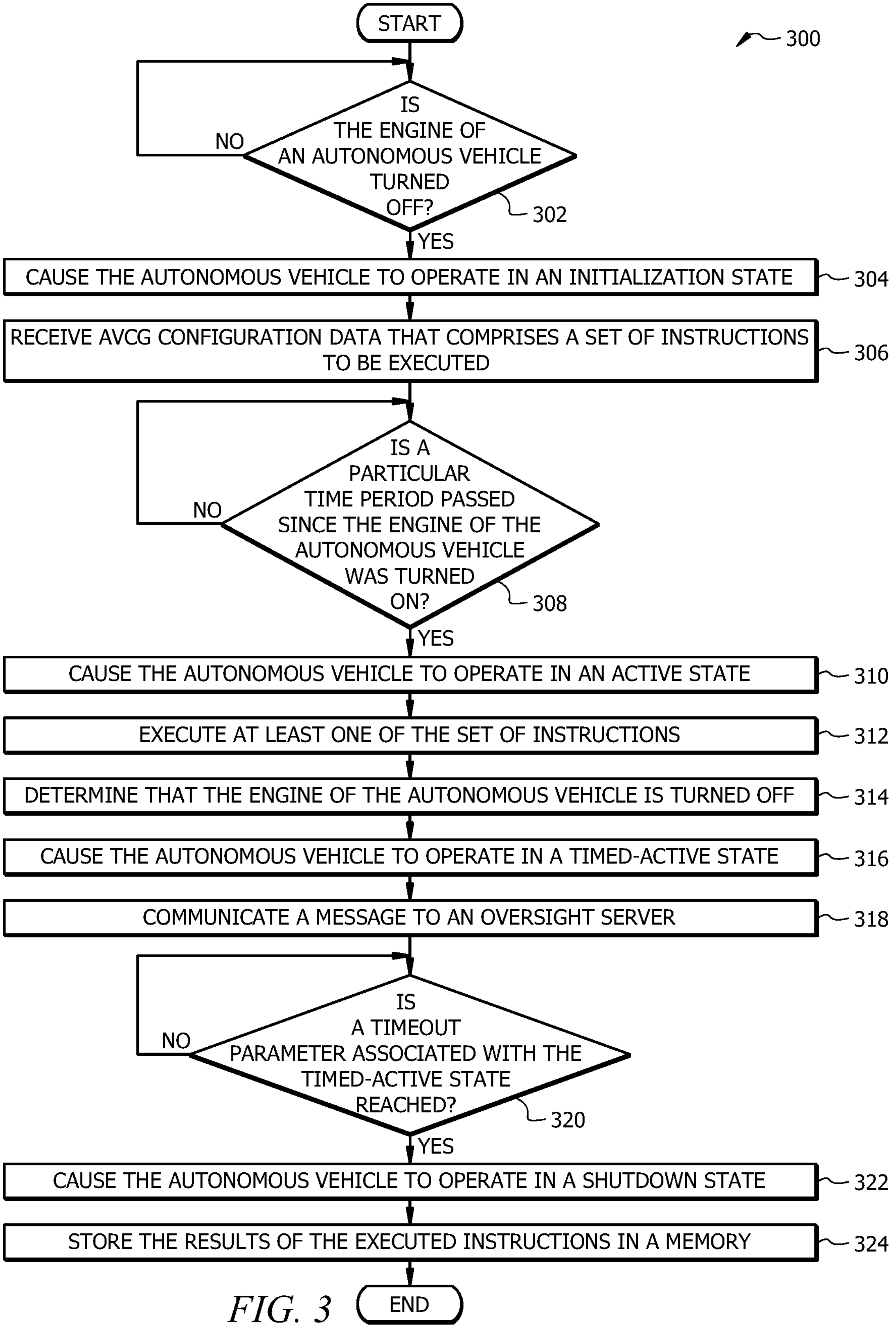
FIG. 3 illustrates an example flowchart of a method for changing the states of operations of an autonomous vehicle in response to respective trigger events.

Example Method for Implementing Trigger-Based State Transitions Based on Particular Trigger Events FIG. 3 illustrates an example flowchart of a method 300 for implementing trigger-based state transitions based on particular trigger events. Modifications, additions, or omissions may be made to method 300. Method 300 may include more, fewer, or other operations. For example, operations may be performed in parallel or in any suitable order. While at times discussed as the system 100, autonomous vehicle 602, control device 650, oversight server 160, or components of any of thereof performing operations, any suitable system or components of the system may perform one or more operations of the method 300. For example, one or more operations of method 300 may be implemented, at least in part, in the form of software instructions 128, AVCG manager 140, software instructions 170, processing instructions 680, respectively, from FIGS. 1 and 6, stored on non-transitory, tangible, machine-readable media (e.g., one or more memory 126, 168, and data storage 690, respectively, from FIGS. 1 and 6) that when run by one or more processors (e.g., processors 122, 162, 670, respectively, from FIGS. 1 and 6) may cause the one or more processors to perform operations 302-324.

At operation 302, the control device 650 determines whether the engine (642*a* in FIG. 3) of the autonomous vehicle 602 is turned on (i.e., ignited). For example, the control device 650 may determine that the engine of the autonomous vehicle 602 is turned on if a signal indicating that the engine is turned on is communicated from the engine (or any of the vehicle subsystems 640 of FIG. 6) to the gateway processor 122. If it is determined that the engine of the autonomous vehicle 602 is turned on, the method 300 may proceed to operation 304. Otherwise, method 300 may remain at operation 302 and wait until it is determined that the engine of the autonomous vehicle 602 is turned on. For example, before a trip of the autonomous vehicle 602 begins, the engine of the autonomous vehicle 602 may be turned off. For preparing the autonomous vehicle 602 for the trip, the engine of the autonomous vehicle 602 may be turned on.

At operation 304, the control device 650 causes the autonomous vehicle 602 to operate in an initiation state 112. In other words, the AVCG manager 140 may transition into the initiation state 112. At operation 306, the control device 650 receives AVCG configuration data 142 that comprises a set of instructions 144 to be executed. The control device 650 may receive the AVCG configuration data 142 from the oversight server 160. The examples of the set of instructions 144 are described in FIG. 1.

At operation 308, the control device 650 determines whether a particular time period 146 has passed since the engine of the autonomous vehicle 602 was turned on. The particular time period 146 may be one minute, two minutes, ten minutes, or any other suitable period. If it is determined that the particular time period 146 has passed since the engine of the autonomous vehicle 602 was turned on, method 300 proceeds to operation 310. Otherwise, method 300 may remain at operation 308 and wait until the particular time period 146 is reached. For example, the control device 650 may cause the autonomous vehicle 602 to transition from the initiation state 112 to the active state 114 in response to detecting that the particular time period 146 has passed since the engine of the autonomous vehicle 602 was turned on.

At operation 310, the control device 650 causes the autonomous vehicle 602 to operate in an active state 114. When the autonomous vehicle 602 start its journey toward a predetermined destination, the autonomous vehicle 602 may transition to the active state 114. For example, the control device 650 may cause the autonomous vehicle 602 to transition from the initiation state 112 to the active state 114 in response to detecting that the particular time period 146 is reached. In other words, the AVCG manager 140 may transition into the active state 114.

At operation 312, the control device 650 executes at least one of the set of instructions 144. For example, while the autonomous vehicle 602 is traveling along a road, the control device 650 may execute at least one of the set of instructions 144, similar to that described in FIG. 1.

At operation 314, the control device 650 determines that the engine of the autonomous vehicle 602 is turned off at a second timestamp. For example, while traveling on a road, if the autonomous vehicle 602 is involved in an accident, the engine of the autonomous vehicle 602 may unexpectedly turn off. In response, the control device 650 may determine that the engine of the autonomous vehicle 602 is turned off due to an unexpected event. In the same or another example, the control device 650 may cause the autonomous vehicle 602 to transition from the active state 114 to the timed-active state 116 in response to detecting a trajectory determined by the planning module 762 (see FIG. 7) is outside of the operation design domain (ODD) of the autonomous vehicle 602—meaning that the control device 650 is not able to navigate the autonomous vehicle 602 according to the proposed trajectory. For example, if the planning module 762 (see FIG. 7) proposes a trajectory to make a sharp left turn that is not possible for the autonomous vehicle 602, the control device 650 may cause the autonomous vehicle 602 to transition from the active state 114 to the timed-active state 116 and/or cause the engine of the autonomous vehicle 602 to be turned off and/or perform an MRC operation, such as pull over the autonomous vehicle 602, stop the autonomous vehicle 602, etc.

At operation 316, the control device 650 causes the autonomous vehicle 602 to operate in a timed-active state 116. The control device 650 may cause the autonomous vehicle 602 to transition from the active state 114 to the timed-active state 116 if it is determined that the engine of the autonomous vehicle 602 is turned off unexpectedly, similar to that described in FIG. 1. The control device 650 may determine that the engine of the autonomous vehicle 602 is turned off unexpectedly if the autonomous vehicle 602 has not reached the predetermined destination and/or if the autonomous vehicle 602 is involved in a road accident.

At operation 318, the control device 650 communicates a message 156 to the oversight server 160. In the case that it is determined the engine of the autonomous vehicle 602 is turned off unexpectedly, the message 156 may be a rescue message that includes the last determined location of the autonomous vehicle 602. In the case that it is determined the autonomous vehicle 602 has reached a destination safely, the message 156 may include an indication that the autonomous vehicle 602 has reached the destination safely.

At operation 420, the control device 650 determines whether the timeout parameter 174 associated with the timed-active state 116 is reached. If it is determined that the timeout parameter 174 is reached since the AVCG manager 140 transitioned into the timed-active state 116, method 300 proceeds to operation 322. Otherwise, method 300 remains at operation 420 and waits until the timeout parameter 174 is reached.

At operation 322, the control device 650 causes the autonomous vehicle 602 to operate in a shutdown state 118. The control device 650 may cause the autonomous vehicle 602 to transition from the timed-active state 116 to the shutdown state 118 if it is determined that the timeout parameter 174 is reached. At operation 324, the control device 650 stores the results 176 of the executed instructions 144 in the memory 126.

AVCG Agent and its Operations

Figure 4:
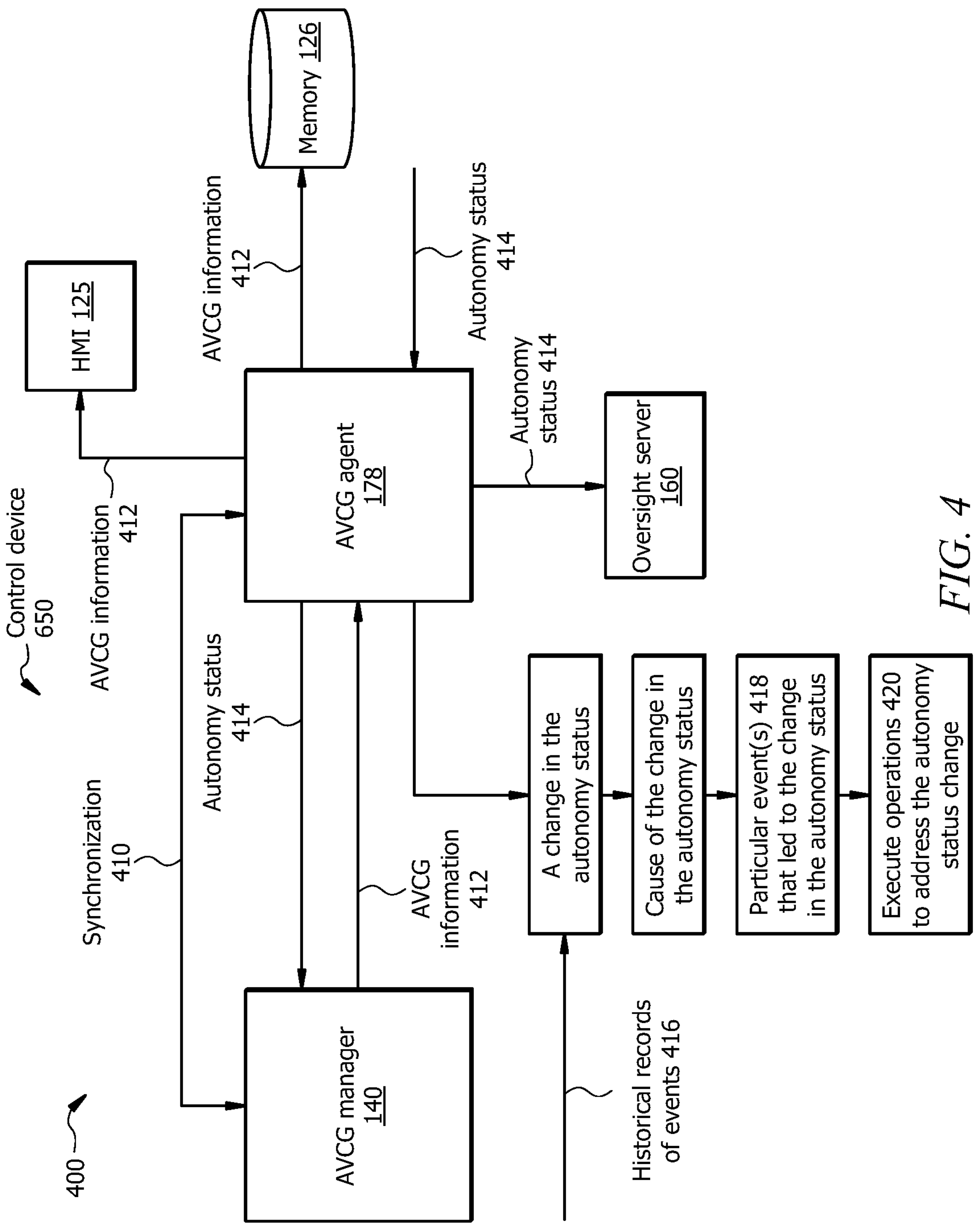
FIG. 4 illustrates an example operational flow of the system of FIG. 1 for addressing a change in an autonomy status of the autonomous vehicle.

FIG. 4 illustrates an example operational flow 400 of the system 100 (see FIG. 1) to implement the AVCG agent 178 and its operations, including addressing a change in the autonomy status 414 of the autonomous vehicle 602. In certain embodiments, the AVCG agent 178 may reside within the control device 650. In other embodiments, the AVCG agent 178 may reside within any other computer system. The operational flow 400 may begin when the AVCG agent 178 and the AVCG manager 140 perform a synchronization operation 410. In the synchronization operation 410, the data processing and data transfer speed and/or pulse is synchronized between the AVCG agent 178 and the AVCG manager 140, for example, by the AVCG manager 140, AVCG agent 178, and/or the control device 650.

Accessing the AVCG Information

The AVCG agent 178 may receive the AVCG information 412 from the AVCG manager 140. In certain embodiments, the AVCG manager 140 may reside in an AVCG device that is communicatively coupled to the control device 650. In certain embodiments, each of the AVCG manager 140 and the AVCG agent 178 may reside in the same or different computing systems. In certain embodiments, the AVCG manager 140 and the AVCG agent 178 may be communicatively coupled to each other via wires and/or wireless communications.

In certain embodiments, the AVCG information 412 may include information associated with the AVCG manager 140, information associated with network providers 180*a-b*, and information associated with network communication protocols, similar to that described in FIG. 1. The AVCG agent 178 may display the AVCG information 412 on the HMI 125. For example, if the AVCG manager 140 is inactive or otherwise not operational, a message that indicates the AVCG manager 140 is inactive may be displayed on the HMI 125.

The AVCG agent 178 may store the AVCG information 412 in the memory 126, for example, for keeping records of the AVCG information 412. In certain embodiments, the AVCG agent 178 may also store cellular information 150*a-b*, AVCG logs (e.g., updates in the AVCG manager 140, states of operation of the AVCG manage 140, etc.), AVCG metadata (e.g., AVCG manager 140's serial number, software version, media access control (MAC) address, etc.) in the memory 126.

Detecting the Autonomy Status of the Autonomous Vehicle

The AVCG agent 178 may determine the autonomy status 414 of the autonomous vehicle 602. In certain embodiments, the AVCG agent 178 may determine the autonomy status 414 of the autonomous vehicle 602 based on the signals that indicate the autonomy status 414 of the autonomous vehicle 602, where the signals may be received from the processor 122 (see FIG. 1). The signals may be originated from one or more of the vehicle subsystems (640 in FIG. 6). The autonomy status 414 may indicate whether the autonomous vehicle 602 is in an autonomous mode, a non-autonomous mode, a parking mode, or any other mode that can be contemplated for the autonomous vehicle 602. The AVCG agent 178 may communicate the autonomy status 414 to the AVCG manager 140 and/or the oversight server 160.

In some cases, the autonomy status 414 of the autonomous vehicle 602 may change. For example, if it is determined that the autonomous vehicle 602 is not able to travel through a particular route autonomously, the control device 650 may change the autonomy status 414 of the autonomous vehicle 602 from the autonomous mode to a non-autonomous mode. For example, the control device 650 may pull over the autonomous vehicle 602. In the same or another example, the control device 650 may change the autonomy status 414 of the autonomous vehicle 602 to non-autonomous mode so that a driver can manually drive the autonomous vehicle 602 through the particular route. In some examples, autonomous vehicle 602 may generally be manually operated while it is in an autonomous vehicle terminal. Thus, before the autonomous vehicle 602 starts its journey on a road autonomously or after the autonomous vehicle 602 returns to the autonomous vehicle terminal, the autonomy status 414 of the autonomous vehicle 602 may change accordingly.

The AVCG agent 178 may determine the cause of the change in the autonomy status 414. In this process, the AVCG agent 178 may access the historical records of events 416, trace back through the historical records of events 416, access the AVCG information 412, and trace back through the AVCG information 412. In certain embodiments, tracing back through the historical records of event 416 may include parsing the historical records of events 416 by implementing a natural language processing, text processing, data object recognition, converting data in a string format from a file, analyzing a string of symbols by natural language processing, computer languages, or data structures, and the like. Similarly, in certain embodiments, tracing back through the AVCG information 412 may include parsing the AVCG information 412 by implementing a natural language processing, text processing, data object recognition, converting data in a string format from a file, analyzing a string of symbols by natural language processing, computer languages, or data structures, and the like.

Based on the tracing back through the historical records of events 416 and the AVCG information 412, the AVCG agent 178 may determine one or more particular events 418 from among the historical records of events 416 and/or the AVCG information 412 that led to the change in the autonomy status 414. For example, the detected event(s) 418 may include an anomalous proposed trajectory plan that takes the autonomous vehicle 602 out of an operational design domain (ODD) of the autonomous vehicle 602, where the operational design domain (ODD) of the autonomous vehicle 602 may indicate maneuvers that the autonomous vehicle 602 is capable of performing autonomously. In a particular example, assume that the planning module 762 (see FIG. 7) proposes a trajectory to make a sharp left turn that is not possible for the autonomous vehicle 602. This event 418 may be found in the historical records of events 416. In response to this anomalous trajectory plan, the control device 650 may determine that the autonomous vehicle 602 is not able to be navigated according to the anomalous trajectory and change the autonomy status 414 of the autonomous vehicle 602 from the autonomous mode to non-autonomous and hence park, pull over, or stop the autonomous vehicle 602.

In response, the AVCG agent 178 may analyze and trace back through the historical records of events 416 and determine that the cause of the change in the autonomy status 414 is the anomalous trajectory plan. In response to detecting the cause of the change in the autonomy status 414, the control device 650 may provide a solution to remedy the cause of the change in the autonomy status 414. For example, the control device 650 may debug the issue that caused the change in the autonomy status 414. In the example described above regarding the anomalous trajectory plan, the control device 650 may determine a reason why the planning module 762 (see FIG. 7) proposed the anomalous trajectory plan. For example, the control device 650 may determine that the reason for the anomalous trajectory plan may be an out-of-date map data 134, an out-of-date trajectory planning algorithm, among others. In response, the control device 650 may also update the map data 134, update the trajectory planning algorithm, and/or perform any suitable operation 420 to debug the cause of the change in the autonomy status 414. In this manner, the disclosed system further provides improvements to the autonomous vehicle technology and to the navigation of the autonomous vehicles 602.

The AVCG agent 178 may output the detected event(s) 418. For example, the AVCG agent 178 may output the detected event(s) 418 to the AVCG manager 140 and/or the oversight server 160. The control device 650 (e.g., via the AVCG agent 178) may execute one or more operations 420 to address (or remedy) the cause of the change in the autonomy status 414. For example, if it is determined that the cause of the change in the autonomy status 414 is an out-of-date instruction indicated in the AVCG manager 140 (or an out-of-date version of the AVCG manager 140), the control device 650 (e.g., via the AVCG agent 178) may update the AVCG manager 140. In this example, updating the AVCG manager 140 may be an example of the operation 420. Thus, in certain embodiments, the determined cause of the change in the autonomy status 414 may be used to update a software version of the AVCG manager 140 in response to determining that the detected event(s) 418 are associated with an out-of-date instruction indicated in the AVCG manager 140. In other words, the determined cause of the change in the autonomy status 414 may be used to update a software version of the AVCG manager 140 if it is determined that the AVCG manager 140 is out of date.

In certain embodiments, the change in the autonomy status 414 may be an unexpected change. For example, if the autonomous vehicle 602 is involved in an accident, the autonomy status 414 of the autonomous vehicle 602 may be automatically changed to stop mode, and in response, the autonomous vehicle 602 may stop. In the same or another example, the change in the autonomy status 414 may be unexpected if the autonomy status 414 of the autonomous vehicle 602 is changed without an explicit command to change the autonomy status 414 from the control device 650.

In certain embodiments, the change in the autonomy status 414 may be an unexpected change in a case where an anomalous trajectory plan that is proposed to navigate the autonomous vehicle 602 takes the autonomous vehicle 602 out of the operational design domain of the autonomous vehicle 602. In certain embodiments, the examples of the operations 420 may include updating the AVCG manager 140, updating any software component associated with the autonomous vehicle 602, any hardware component associated with the autonomous vehicle 602, recommending to change a navigation plan of the autonomous vehicle 602, changing the navigation plan of the autonomous vehicle 602, among others. For example, if it is determined that the autonomous vehicle 602 is not able to travel through a road because of poor road conditions, extreme weather conditions, congested traffic, etc., the autonomy status 414 of the autonomous vehicle 602 may be changed and an operation 420 (e.g., rerouting the autonomous vehicle 602, pulling over the autonomous vehicle 602, stopping the autonomous vehicle 602, etc.) may be executed.

Figure 5:
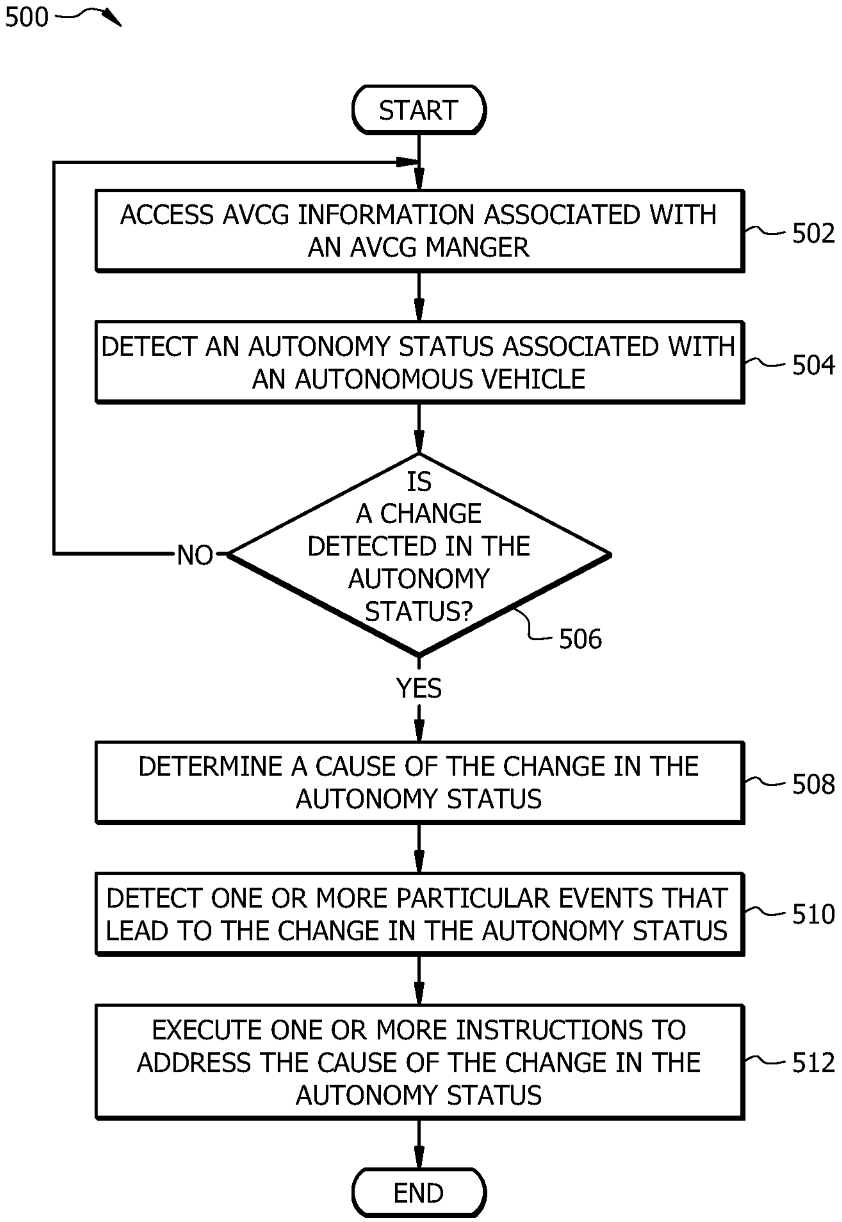
FIG. 5 illustrates an example flowchart of a method to address a change in an autonomy status of the autonomous vehicle.

Example Method for Addressing a Cause of a Change in the Autonomy Status of an Autonomous Vehicle FIG. 5 illustrates an example flowchart of a method 500 for addressing a cause of a change in the autonomy status 414 of an autonomous vehicle 602. Modifications, additions, or omissions may be made to method 500. Method 500 may include more, fewer, or other operations. For example, operations may be performed in parallel or in any suitable order. While at times discussed as the system 100, autonomous vehicle 602, control device 650, oversight server 160, or components of any of thereof performing operations, any suitable system or components of the system may perform one or more operations of the method 500. For example, one or more operations of method 500 may be implemented, at least in part, in the form of software instructions 128, AVCG manager 140, AVCG agent 178, software instructions 170, processing instructions 680, respectively, from FIGS. 1 and 6, stored on non-transitory, tangible, machine-readable media (e.g., one or more memory 126, 168, and data storage 690, respectively, from FIGS. 1 and 6) that when run by one or more processors (e.g., processors 122, 162, 670, respectively, from FIGS. 1 and 6) may cause the one or more processors to perform operations 502-512.

At operation 502, the control device 650 (e.g., via the AVCG agent 178) accesses AVCG information 412 associated with the AVCG manager 140. For example, the AVCG agent 178 may receive the AVCG information 412 from the AVCG manager 140. The control device 650 (e.g., via the AVCG agent 178) may also access historical records of events 416 that include information about historical operations of the autonomous vehicle 602, such as status, health data, states 112-118 of operations, among others.

At operation 504, the control device 650 (e.g., via the AVCG agent 178) detects an autonomy status 414 associated with the autonomous vehicle 602. For example, the AVCG agent 178 may receive signals that indicate the autonomy status 414 of the autonomous vehicle 602 from the vehicle subsystems 640 (see FIG. 6), similar to that described in FIG. 3.

At operation 506, the control device 650 (e.g., via the AVCG agent 178) may determine whether a change in the autonomy status 414 is detected. In certain embodiments, the control device 650 (e.g., via the AVCG agent 178) may analyze the historical records of the received autonomy status 414 and compare the current autonomy status 414 of the autonomous vehicle 602 with the recent historical records of the received autonomy status 414 to determine whether there is a change in the autonomy status 414 of the autonomous vehicle 602. In certain embodiments, the control device 650 (e.g., via the AVCG agent 178) may analyze the AVCG information 412 and/or the historical records of events 416 to determine whether there is a change in the autonomy status 414 of the autonomous vehicle 602. If it is determined that a change in the autonomy status 414 of the autonomous vehicle 602 is detected, method 500 may proceed to operation 508. Otherwise, method 500 may return to operation 502.

At operation 508, the control device 650 (e.g., via the AVCG agent 178) determines the cause of the change in the autonomy status 414. In certain embodiments, the control device 650 (e.g., via the AVCG agent 178) may trace back through and analyze the AVCG information 412 and the historical records of events 416 to determine the cause of the change in the autonomy status 414, similar to that described in FIG. 3.

At operation 510, the control device 650 (e.g., via the AVCG agent 178) detects one or more particular events 418 that led to the change in the autonomy status 414, similar to that described in FIG. 3.

At operation 512, the control device 650 (e.g., via the AVCG agent 178) may execute one or more instructions 320 to address (or remedy) the cause of the change in the autonomy status 414 to reduce (or prevent) unexpected autonomy status changes, similar to that described in FIG. 3.

Example Autonomous Vehicle and its Operation

FIG. 6 shows a block diagram of an example vehicle ecosystem 600 in which autonomous driving operations can be determined. As shown in FIG. 6, the autonomous vehicle 602 may be a semi-trailer truck. The vehicle ecosystem 600 may include several systems and components that can generate and/or deliver one or more sources of information/data and related services to the in-vehicle control computer 650 that may be located in an autonomous vehicle 602. The in-vehicle control computer 650 can be in data communication with a plurality of vehicle subsystems 640, all of which can be resident in the autonomous vehicle 602. A vehicle subsystem interface 660 may be provided to facilitate data communication between the in-vehicle control computer 650 and the plurality of vehicle subsystems 640. In some embodiments, the vehicle subsystem interface 660 can include a controller area network (CAN) controller to communicate with devices in the vehicle subsystems 640.

The autonomous vehicle 602 may include various vehicle subsystems that support the operation of the autonomous vehicle 602. The vehicle subsystems 640 may include a vehicle drive subsystem 642, a vehicle sensor subsystem 644, a vehicle control subsystem 648, and/or network communication subsystem 692. The components or devices of the vehicle drive subsystem 642, the vehicle sensor subsystem 644, and the vehicle control subsystem 648 shown in FIG. 6 are examples. The autonomous vehicle 602 may be configured as shown or any other configurations.

The vehicle drive subsystem 642 may include components operable to provide powered motion for the autonomous vehicle 602. In an example embodiment, the vehicle drive subsystem 642 may include an engine/motor 642*a*, wheels/tires 642*b*, a transmission 642*c*, an electrical subsystem 642*d*, and a power source 642*c*.

The vehicle sensor subsystem 644 may include a number of sensors 646 configured to sense information about an environment or condition of the autonomous vehicle 602. The vehicle sensor subsystem 644 may include one or more cameras 646*a* or image capture devices, a radar unit 646*b*, one or more thermal sensors 646*c*, a wireless communication unit 646*d* (e.g., a cellular communication transceiver), an inertial measurement unit (IMU) 646*e*, a laser range finder/LiDAR unit 646*f*, a Global Positioning System (GPS) transceiver 646*g*, a wiper control system 646*h*. The vehicle sensor subsystem 644 may also include sensors configured to monitor internal systems of the autonomous vehicle 602 (e.g., an 02 monitor, a fuel gauge, an engine oil temperature, etc.).

The IMU 646*e* may include any combination of sensors (e.g., accelerometers and gyroscopes) configured to sense position and orientation changes of the autonomous vehicle 602 based on inertial acceleration. The GPS transceiver 646*g* may be any sensor configured to estimate a geographic location of the autonomous vehicle 602. For this purpose, the GPS transceiver 646*g* may include a receiver/transmitter operable to provide information regarding the position of the autonomous vehicle 602 with respect to the Earth. The radar unit 646*b* may represent a system that utilizes radio signals to sense objects within the local environment of the autonomous vehicle 602. In some embodiments, in addition to sensing the objects, the radar unit 646*b* may additionally be configured to sense the speed and the heading of the objects proximate to the autonomous vehicle 602. The laser range finder or LiDAR unit 646*f* may be any sensor configured to use lasers to sense objects in the environment in which the autonomous vehicle 602 is located. The cameras 646*a* may include one or more devices configured to capture a plurality of images of the environment of the autonomous vehicle 602. The cameras 646*a* may be still image cameras or motion video cameras.

Cameras 646*a* may be rear-facing and front-facing so that pedestrians, and any hand signals made by them or signs held by pedestrians, may be observed from all around the autonomous vehicle. These cameras 646*a* may include video cameras, cameras with filters for specific wavelengths, as well as any other cameras suitable to detect hand signals, hand-held traffic signs, or both hand signals and hand-held traffic signs. A sound detection array, such as a microphone or array of microphones, may be included in the vehicle sensor subsystem 644. The microphones of the sound detection array may be configured to receive audio indications of the presence of, or instructions from, authorities, including sirens and commands such as "Pull over." These microphones are mounted, or located, on the external portion of the vehicle, specifically on the outside of the tractor portion of an autonomous vehicle. Microphones used may be any suitable type, mounted such that they are effective both when the autonomous vehicle is at rest, as well as when it is moving at normal driving speeds.

The vehicle control subsystem 648 may be configured to control the operation of the autonomous vehicle 602 and its components. Accordingly, the vehicle control subsystem 648 may include various elements such as a throttle and gear selector 648*a*, a brake unit 648*b*, a navigation unit 648*c*, a steering system 648*d*, and/or an autonomous control unit 648*e*. The throttle and gear selector 648*a* may be configured to control, for instance, the operating speed of the engine and, in turn, control the speed of the autonomous vehicle 602. The throttle and gear selector 648*a* may be configured to control the gear selection of the transmission. The brake unit 648*b* can include any combination of mechanisms configured to decelerate the autonomous vehicle 602. The brake unit 648*b* can slow the autonomous vehicle 602 in a standard manner, including by using friction to slow the wheels or engine braking. The brake unit 648*b* may include an anti-lock brake system (ABS) that can prevent the brakes from locking up when the brakes are applied. The navigation unit 648*c* may be any system configured to determine a driving path or route for the autonomous vehicle 602. The navigation unit 648*c* may additionally be configured to update the driving path dynamically while the autonomous vehicle 602 is in operation. In some embodiments, the navigation unit 648*c* may be configured to incorporate data from the GPS transceiver 646*g* and one or more predetermined maps so as to determine the driving path for the autonomous vehicle 602. The steering system 648*d* may represent any combination of mechanisms that may be operable to adjust the heading of autonomous vehicle 602 in an autonomous mode or in a driver-controlled mode.

The autonomous control unit 648*e* may represent a control system configured to identify, evaluate, and avoid or otherwise negotiate potential obstacles or obstructions in the environment of the autonomous vehicle 602. In general, the autonomous control unit 648*e* may be configured to control the autonomous vehicle 602 for operation without a driver or to provide driver assistance in controlling the autonomous vehicle 602. In some embodiments, the autonomous control unit 648*e* may be configured to incorporate data from the GPS transceiver 646*g*, the radar unit 646*b*, the LiDAR unit 646*f*, the cameras 646*a*, and/or other vehicle subsystems to determine the driving path or trajectory for the autonomous vehicle 602.

The network communication subsystem 692 may comprise network interfaces, such as routers, switches, modems, and/or the like. The network communication subsystem 692 may be configured to establish communication between the autonomous vehicle 602 and other systems, servers, etc. The network communication subsystem 692 may be further configured to send and receive data from and to other systems.

Many or all of the functions of the autonomous vehicle 602 can be controlled by the in-vehicle control computer 650. The in-vehicle control computer 650 may include at least one data processor 670 (which can include at least one microprocessor) that executes processing instructions 680 stored in a non-transitory computer-readable medium, such as the data storage device 690 or memory. The in-vehicle control computer 650 may also represent a plurality of computing devices that may serve to control individual components or subsystems of the autonomous vehicle 602 in a distributed fashion. In some embodiments, the data storage device 690 may contain processing instructions 680 (e.g., program logic) executable by the data processor 670 to perform various methods and/or functions of the autonomous vehicle 602, including those described with respect to FIGS. 1-8.

The data storage device 690 may contain additional instructions as well, including instructions to transmit data to, receive data from, interact with, or control one or more of the vehicle drive subsystem 642, the vehicle sensor subsystem 644, and the vehicle control subsystem 648. The in-vehicle control computer 650 can be configured to include a data processor 670 and a data storage device 690. The in-vehicle control computer 650 may control the function of the autonomous vehicle 602 based on inputs received from various vehicle subsystems (e.g., the vehicle drive subsystem 642, the vehicle sensor subsystem 644, and the vehicle control subsystem 648).

FIG. 7 shows an exemplary system 700 for providing precise autonomous driving operations. The system 700 may include several modules that can operate in the in-vehicle control computer 650, as described in FIG. 6. The in-vehicle control computer 650 may include a sensor fusion module 702 shown in the top left corner of FIG. 7, where the sensor fusion module 702 may perform at least four image or signal processing operations. The sensor fusion module 702 can obtain images from cameras located on an autonomous vehicle to perform image segmentation 704 to detect the presence of moving objects (e.g., other vehicles, pedestrians, etc.) and/or static obstacles (e.g., stop sign, speed bump, terrain, etc.) located around the autonomous vehicle. The sensor fusion module 702 can obtain LiDAR point cloud data item from LiDAR sensors located on the autonomous vehicle to perform LiDAR segmentation 706 to detect the presence of objects and/or obstacles located around the autonomous vehicle.

The sensor fusion module 702 can perform instance segmentation 708 on image and/or point cloud data items to identify an outline (e.g., boxes) around the objects and/or obstacles located around the autonomous vehicle. The sensor fusion module 702 can perform temporal fusion 710 where objects and/or obstacles from one image and/or one frame of point cloud data item are correlated with or associated with objects and/or obstacles from one or more images or frames subsequently received in time.

The sensor fusion module 702 can fuse the objects and/or obstacles from the images obtained from the camera and/or point cloud data item obtained from the LiDAR sensors. For example, the sensor fusion module 702 may determine based on a location of two cameras that an image from one of the cameras comprising one half of a vehicle located in front of the autonomous vehicle is the same as the vehicle captured by another camera. The sensor fusion module 702 may send the fused object information to the tracking or prediction module 746 and the fused obstacle information to the occupancy grid module 760. The in-vehicle control computer may include the occupancy grid module 760 which can retrieve landmarks from a map database 758 stored in the in-vehicle control computer. The occupancy grid module 760 can determine drivable areas and/or obstacles from the fused obstacles obtained from the sensor fusion module 702 and the landmarks stored in the map database 758. For example, the occupancy grid module 760 can determine that a drivable area may include a speed bump obstacle.

As shown in FIG. 7 below the sensor fusion module 702, the in-vehicle control computer (650 in FIG. 6) may include a LiDAR-based object detection module 712 that can perform object detection 716 based on point cloud data item obtained from the LiDAR sensors 714 located on the autonomous vehicle. The object detection 716 technique can provide a location (e.g., in 3D world coordinates) of objects from the point cloud data item. Below the LiDAR-based object detection module 712, the in-vehicle control computer may include an image-based object detection module 718 that can perform object detection 724 based on images obtained from cameras 720 located on the autonomous vehicle. For example, the object detection 718 technique can employ a deep image-based object detection 724 (e.g., a machine learning technique) to provide a location (e.g., in 3D world coordinates) of objects from the image provided by the camera 720.

The radar 756 on the autonomous vehicle can scan an area surrounding the autonomous vehicle or an area towards which the autonomous vehicle is driven. The Radar data may be sent to the sensor fusion module 702 that can use the Radar data to correlate the objects and/or obstacles detected by the radar 756 with the objects and/or obstacles detected from both the LiDAR point cloud data item and the camera image. The Radar data also may be sent to the tracking or prediction module 746 that can perform data processing on the Radar data to track objects by object tracking module 748 as further described below.

The in-vehicle control computer may include a tracking or prediction module 746 that receives the locations of the objects from the point cloud and the objects from the image, and the fused objects from the sensor fusion module 702. The tracking or prediction module 746 also receives the Radar data with which the tracking or prediction module 746 can track objects by object tracking module 748 from one point cloud data item and one image obtained at one time instance to another (or the next) point cloud data item and another image obtained at another subsequent time instance.

The tracking or prediction module 746 may perform object attribute estimation 750 to estimate one or more attributes of an object detected in an image or point cloud data item. The one or more attributes of the object may include a type of object (e.g., pedestrian, car, or truck, etc.). The tracking or prediction module 746 may perform behavior prediction 752 to estimate or predict the motion pattern of an object detected in an image and/or a point cloud. The behavior prediction 752 can be performed to detect a location of an object in a set of images received at different points in time (e.g., sequential images) or in a set of point cloud data items received at different points in time (e.g., sequential point cloud data items). In some embodiments, the behavior prediction 752 can be performed for each image received from a camera and/or each point cloud data item received from the LiDAR sensor. In some embodiments, the tracking or prediction module 746 can be performed (e.g., run or executed) on received data to reduce computational load by performing behavior prediction 752 on every other or after every pre-determined number of images received from a camera or point cloud data item received from the LiDAR sensor (e.g., after every two images or after every three-point cloud data items).

The behavior prediction 752 feature may determine the speed and direction of the objects that surround the autonomous vehicle from the Radar data, where the speed and direction information can be used to predict or determine motion patterns of objects. A motion pattern may comprise a predicted trajectory information of an object over a pre-determined length of time in the future after an image is received from a camera. Based on the motion pattern predicted, the tracking or prediction module 746 may assign motion pattern situational tags to the objects (e.g., "located at coordinates (x,y)," "stopped," "driving at 50 mph," "speeding up" or "slowing down"). The situation tags can describe the motion pattern of the object. The tracking or prediction module 746 may send the one or more object attributes (e.g., types of the objects) and motion pattern situational tags to the planning module 762. The tracking or prediction module 746 may perform an environment analysis 754 using any information acquired by system 700 and any number and combination of its components.

The in-vehicle control computer may include the planning module 762 that receives the object attributes and motion pattern situational tags from the tracking or prediction module 746, the drivable area and/or obstacles, and the vehicle location and pose information from the fused localization module 726 (further described below).

The planning module 762 can perform navigation planning 764 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 764 may include determining an area next to the road where the autonomous vehicle can be safely parked in a case of emergencies. The planning module 762 may include behavioral decision making 766 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 762 performs trajectory generation 768 and selects a trajectory from the set of trajectories determined by the navigation planning operation 764. The selected trajectory information may be sent by the planning module 762 to the control module 770.

The in-vehicle control computer may include a control module 770 that receives the proposed trajectory from the planning module 762 and the autonomous vehicle location and pose from the fused localization module 726. The control module 770 may include a system identifier 772. The control module 770 can perform a model-based trajectory refinement 774 to refine the proposed trajectory. For example, the control module 770 can apply filtering (e.g., Kalman filter) to make the proposed trajectory data smooth and/or to minimize noise. The control module 770 may perform the robust control 776 by determining, based on the refined proposed trajectory information and current location and/or pose of the autonomous vehicle, an amount of brake pressure to apply, a steering angle, a throttle amount to control the speed of the vehicle, and/or a transmission gear. The control module 770 can send the determined brake pressure, steering angle, throttle amount, and/or transmission gear to one or more devices in the autonomous vehicle to control and facilitate precise driving operations of the autonomous vehicle.

The deep image-based object detection 724 performed by the image-based object detection module 718 can also be used detect landmarks (e.g., stop signs, speed bumps, etc.) on the road. The in-vehicle control computer may include a fused localization module 726 that obtains landmarks detected from images, the landmarks obtained from a map database 736 stored on the in-vehicle control computer, the landmarks detected from the point cloud data item by the LiDAR-based object detection module 712, the speed and displacement from the odometer sensor 744, or a rotary encoder, and the estimated location of the autonomous vehicle from the GPS/IMU sensor 738 (i.e., GPS sensor 740 and IMU sensor 742) located on or in the autonomous vehicle. Based on this information, the fused localization module 726 can perform a localization operation 728 to determine a location of the autonomous vehicle, which can be sent to the planning module 762 and the control module 770.

The fused localization module 726 can estimate pose 730 of the autonomous vehicle based on the GPS and/or IMU sensors 738. The pose of the autonomous vehicle can be sent to the planning module 762 and the control module 770. The fused localization module 726 can also estimate status (e.g., location, possible angle of movement) of the trailer unit based on (e.g., trailer status estimation 734), for example, the information provided by the IMU sensor 742 (e.g., angular rate and/or linear velocity). The fused localization module 726 may also check the map content 732.

Figure 8:
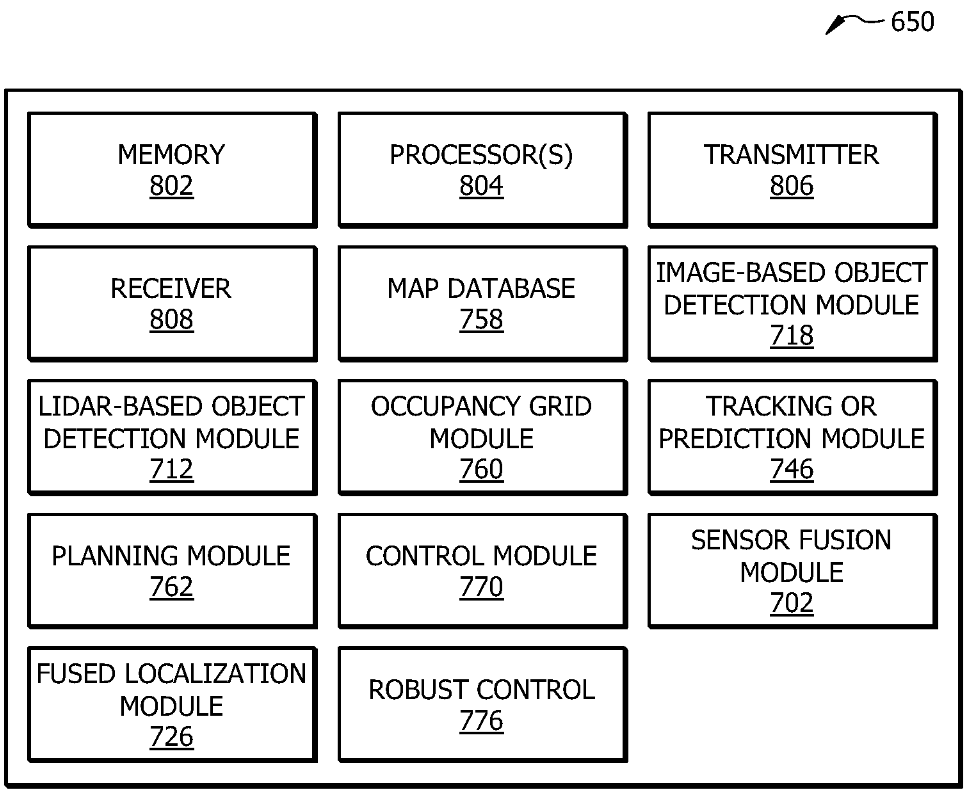
FIG. 8 illustrates a block diagram of an in-vehicle control computer included in the autonomous vehicle of FIG. 6.

FIG. 8 shows an exemplary block diagram of an in-vehicle control computer 650 included in an autonomous vehicle 602. The in-vehicle control computer 650 may include at least one processor 804 and a memory 802 having instructions stored thereupon (e.g., software instructions 128 and processing instructions 680 in FIGS. 1 and 6, respectively). The instructions, upon execution by the processor 804, configure the in-vehicle control computer 650 and/or the various modules of the in-vehicle control computer 650 to perform the operations described in FIGS. 1-8. The transmitter 806 may transmit or send information or data to one or more devices in the autonomous vehicle. For example, the transmitter 806 can send an instruction to one or more motors of the steering wheel to steer the autonomous vehicle. The receiver 808 receives information or data transmitted or sent by one or more devices. For example, the receiver 808 receives a status of the current speed from the odometer sensor or the current transmission gear from the transmission. The transmitter 806 and receiver 808 also may be configured to communicate with the plurality of vehicle subsystems 640 and the in-vehicle control computer 650 described above in FIGS. 6 and 7.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system comprising:
- a memory configured to store an indication of a particular time period associated with an initiation state, the particular time period indicating a time when the initiation state ends; and
- a gateway processor operably coupled to the memory, and configured to:
  - determine that an engine of an autonomous vehicle is turned on at a first timestamp;
  - in response to determining that the engine of the autonomous vehicle is turned on at the first timestamp:
    - cause the autonomous vehicle to operate in the initiation state, wherein:
      - during the initiation state, Autonomous Vehicle Communication Gateway (AVCG) configuration data is communicated to the autonomous vehicle; and
      - the AVCG configuration data comprises a set of instructions to control operations of the autonomous vehicle;
  - determine that the particular time period has passed since the engine of the autonomous vehicle was turned on;
  - in response to determining that the particular time period has passed since the engine of the autonomous vehicle was turned on, cause the autonomous vehicle to operate in an active state;
  - while in the active state, execute at least one of the set of instructions;
  - determine that the engine of the autonomous vehicle is turned off at a second timestamp;
  - in response to determining that the engine of the autonomous vehicle is turned off at the second timestamp, cause the autonomous vehicle to operate in a timed-active state, wherein the timed-active state is associated with a timeout parameter, such that when the timeout parameter is reached, the timed-active state ends;
  - while in the timed-active state, communicate a message to an oversight server;
  - determine that the timeout parameter is reached;
  - in response to determining that the timeout parameter is reached, cause the autonomous vehicle to operate in a shutdown state; and
  - while in the shutdown state, store a result of executing the at least one of the set of instructions in the memory.

Clause 2. The system of Clause 1, wherein the gateway processor causes the autonomous vehicle to transition from the initiation state into the active state in response to determining that the particular time period has passed since the engine of the autonomous vehicle was turned on.

Clause 3. The system of Clause 1, wherein the gateway processor causes the autonomous vehicle to transition from the active state into the timed-active state in response to determining that the engine of the autonomous vehicle is turned off.

Clause 4. The system of Clause 1, wherein the gateway processor causes the autonomous vehicle to transition from the active state into the timed-active state in response to detecting that a trajectory determined for the autonomous vehicle is outside of an operation of the autonomous vehicle.

Clause 5. The system of Clause 1, wherein the gateway processor causes the autonomous vehicle to transition from the timed-active state into the shutdown state in response to determining that the timeout parameter is reached.

Clause 6. The system of Clause 1, wherein the set of instructions comprises an instruction that indicates to set a Quality of Service (QOS) to each network path based at least in part upon a priority level associated with each network path, such that:
- the instruction indicates to set a first QoS to a first network path, wherein:
  - the first QoS is less than a threshold QoS;
  - the first network path is associated with a first priority level that is less than a threshold priority level; and
  - the first network path is allocated to communicate a location of the autonomous vehicle.

Clause 7. The system of Clause 6, wherein the instruction further indicates to set a second QoS to a second network path, wherein:
- the second QoS is more than the threshold QoS;
- the second network path is associated with a second priority level that is higher than the threshold priority level; and
- the second network path that is allocated to communicate sensor data that provides information about an environment ahead of the autonomous vehicle.

Clause 8. A method comprising:
- determining that an engine of an autonomous vehicle is turned on at a first timestamp;
- in response to determining that the engine of the autonomous vehicle is turned on at the first timestamp:
  - causing the autonomous vehicle to operate in an initiation state, wherein:
    - during the initiation state, Autonomous Vehicle Communication Gateway (AVCG) configuration data is communicated to the autonomous vehicle;
    - the AVCG configuration data comprises a set of instructions to control operations of the autonomous vehicle;
- determining that a particular time period has passed since the engine of the autonomous vehicle was turned on, the particular time period indicating a time when the initiation state ends;

in response to determining that the particular time period has passed since the engine of the autonomous vehicle was turned on, causing the autonomous vehicle to operate in an active state;

while in the active state, executing at least one of the set of instructions;

determining that the engine of the autonomous vehicle is turned off at a second timestamp;

in response to determining that the engine of the autonomous vehicle is turned off at the second timestamp, causing the autonomous vehicle to operate in a timed-active state, wherein the timed-active state is associated with a timeout parameter, such that when the timeout parameter is reached, the timed-active state ends;

while in the timed-active state, communicating a message to an oversight server;

determining that the timeout parameter is reached;

in response to determining that the timeout parameter is reached, causing the autonomous vehicle to operate in a shutdown state; and while in the shutdown state, storing a result of executing the at least one of the set of instructions in a memory that is onboard the autonomous vehicle.

Clause 9. The method of Clause 8, wherein:

the set of instructions comprises an instruction that indicates to select a particular network provider from among at least two network providers to use for data communications, the at least two network providers comprising a first network provider and a second network provider; and the particular network provider is selected based at least in part upon a first cellular information associated with the first network provider and a second cellular information associated with the second network provider, such that in response to determining that the first cellular information comprises network conditions that satisfy network communication requirements, and that the second cellular information comprises network conditions that do not satisfy the network communication requirements, the first network provider is selected over the second network provider.

Clause 10. The method of Clause 9, wherein the first cellular information comprises at least one of:

a first cellular signal bandwidth;

a first cellular signal strength;

a first cellular signal to noise ratio;

a first cellular data package loss rate;

a first cellular signal latency;

a first cellular signal round-trip time; or a first cellular signal bit rate.

Clause 11. The method of Clause 9, wherein the second cellular information comprises at least one of:

a second cellular signal bandwidth;

a second cellular signal strength;

a second cellular signal to noise ratio;

a second cellular data package loss rate;

a second cellular signal latency;

a second cellular signal round-trip time; or a second cellular signal bit rate.

Clause 12. The method of Clause 9, wherein the network communication requirements comprise at least one of:

a threshold network communication bandwidth;

a threshold signal strength;

a threshold signal to noise ratio;

a threshold data package loss rate;

a threshold signal latency;

a threshold signal round-trip time; or a threshold signal bit rate.

Clause 13. The method of Clause 8, wherein the set of instructions comprises an instruction that indicates to cause a gateway processor that is onboard the autonomous vehicle to operate on a battery when the autonomous vehicle transitions into the timed-active state.

Clause 14. The method of Clause 8, wherein the set of instructions comprises an instruction that indicates to communicate an acknowledgement message that indicates the autonomous vehicle is operational to the oversight server.

Clause 15. A non-transitory computer-readable medium storing instructions that when executed by a processor cause the processor to:

determine that an engine of an autonomous vehicle is turned on at a first timestamp;

in response to determining that the engine of the autonomous vehicle is turned on at the first timestamp:

cause the autonomous vehicle to operate in an initiation state, wherein:

during the initiation state, Autonomous Vehicle Communication Gateway (AVCG) configuration data is communicated to the autonomous vehicle;

the AVCG configuration data comprises a set of instructions to control operations of the autonomous vehicle;

determine that a particular time period has passed since the engine of the autonomous vehicle was turned on, the particular time period indicating a time when the initiation state ends;

in response to determining that the particular time period has passed since the engine of the autonomous vehicle was turned on, cause the autonomous vehicle to operate in an active state;

while in the active state, execute at least one of the set of instructions;

determine that the engine of the autonomous vehicle is turned off at a second timestamp;

in response to determining that the engine of the autonomous vehicle is turned off at the second timestamp, cause the autonomous vehicle to operate in a timed-active state, wherein the timed-active state is associated with a timeout parameter, such that when the timeout parameter is reached, the timed-active state ends;

while in the timed-active state, communicate a message to an oversight server;

determine that the timeout parameter is reached;

in response to determining that the timeout parameter is reached, cause the autonomous vehicle to operate in a shutdown state; and while in the shutdown state, store a result of executing the at least one of the set of instructions in a memory that is onboard the autonomous vehicle.

Clause 16. The non-transitory computer-readable medium of Clause 15, wherein the set of instructions comprises an instruction that indicates to communicate a location data associated with the autonomous vehicle to the oversight server.

Clause 17. The non-transitory computer-readable medium of Clause 15, wherein the set of instructions comprises an instruction that indicates to communicate a second message that indicates which network provider from among a set of network providers is selected for data communications to the oversight server.

Clause 18. The non-transitory computer-readable medium of Clause 15, wherein the set of instructions comprises an instruction that indicates to communicate a second message that comprises a set of cellular information associated with a set of network providers and a network information associated with a remote server to the oversight server.

Clause 19. The non-transitory computer-readable medium of Clause 15, wherein the message is a rescue message that comprises a location of the autonomous vehicle.

Clause 20. The non-transitory computer-readable medium of Clause 15, wherein the message indicates to dispatch a driver to a location of the autonomous vehicle.

Clause 21. A system comprising:

a memory configured to store historical records of events that provide information about historical operations of an autonomous vehicle; and a processor operably coupled to the memory, and configured to:

access Autonomous Vehicle Communication Gateway (AVCG) information that comprise information associated with an AVCG manager, wherein the AVCG manager is a software resource configured to transition among states in which the autonomous vehicle operates in response to detecting a respective trigger event;

determine an autonomy status associated with the autonomous vehicle, wherein the autonomy status indicates that the autonomous vehicle is in an autonomous mode, a non-autonomous mode, or a parking mode;

detect a change in the autonomy status; and determine a cause of the change in the autonomy status, wherein determining the cause of the change in the autonomy status comprises:

accessing the historical records of events;

tracking back the historical records of events;

tracking back the AVCG information; and determining one or more particular events from among one or both of the historical records of events and the AVCG information that led to the change in the autonomy status.

Clause 22. The system of Clause 21, wherein the cause of the change is used to update at least a software version of the AVCG manager in response to determining that the one or more particular events are associated with an out-of-date instruction indicated in the AVCG manager.

Clause 23. The system of Clause 21, wherein:

the processor is further configured to display the AVCG information on a user interface; and the user interface is in a cabin of the autonomous vehicle.

Clause 24. The system of Clause 21, wherein the AVCG information associated with the AVCG manager comprises at least one of:

the status in which the autonomous vehicle is operating as indicated by the AVCG manager;

an indication indicating whether the AVCG manager is active; or an indication indicating whether a timeout parameter associated with a timed-active state is reached.

Clause 25. The system of Clause 24, wherein the status in which the autonomous vehicle is operating is one of the following:

an initiation state;

an active state;

the timed-active state; or a shutdown state.

Clause 26. The system of Clause 25, wherein:

the autonomous vehicle operates in the initiation state in response to detecting that an engine of the autonomous vehicle is turned on; and the respective trigger event indicates that the engine of the autonomous vehicle is turned on.

Clause 27. The system of Clause 25, wherein:

the autonomous vehicle operates in the active state in response to detecting that a particular period has passed since an engine of the autonomous vehicle is turned on; and the respective trigger event indicates that the particular period has passed since the engine of the autonomous vehicle is turned on.

Clause 28. The system of Clause 25, wherein:

the autonomous vehicle operates in the timed-active state in response to detecting that an engine of the autonomous vehicle is turned off; and the respective trigger event indicates that the engine of the autonomous vehicle is turned off.

Clause 29. The system of Clause 25, wherein:

the autonomous vehicle operates in the shutdown state in response to detecting that a timeout parameter has ended since an engine of the autonomous vehicle is turned off; and the respective trigger event indicates that the timeout parameter has ended since the engine of the autonomous vehicle is turned off.

Clause 30. A method comprising:

accessing Autonomous Vehicle Communication Gateway (AVCG) information that comprise information associated with an AVCG manager, wherein the AVCG manager is a software resource configured to transition among states in which an autonomous vehicle operates in response to detecting a respective trigger event;

determining an autonomy status associated with the autonomous vehicle, wherein the autonomy status indicates that the autonomous vehicle is in an autonomous mode, a non-autonomous mode, or a parking mode;

detecting a change in the autonomy status; and determining a cause of the change in the autonomy status, wherein determining the cause of the change in the autonomy status comprises:

accessing historical records of events that provide information about historical operations of the autonomous vehicle;

tracking back the historical records of events;

tracking back the AVCG information; and determining one or more particular events from among one or both of the historical records of events and the AVCG information that led to the change in the autonomy status.

Clause 31. The method of Clause 30, wherein the AVCG information further comprises a plurality of cellular information associated with at least two network providers, the plurality of cellular information comprising a first cellular information associated with a first network provider and a second cellular information associated with a second network provider, the AVCG information further comprises which of the first network provider and the second network provider is selected for data communications.

Clause 32. The method of Clause 31, wherein the first cellular information provides information about cellular coverage provided by the first network provider from among the at least two network providers.

Clause 33. The method of Clause 31, wherein the first cellular information comprises at least one of:

a first cellular signal bandwidth;

a first cellular signal strength;

a first cellular signal to noise ratio;

a first cellular data package loss rate;

a first cellular signal latency;

a first cellular signal round-trip time; or a first cellular signal bit rate.

Clause 34. The method of Clause 31, wherein the second cellular information provides information about cellular coverage provided by the second network provider from among the at least two network providers.

Clause 35. The method of Clause 31, wherein the second cellular information comprises at least one of:

a second cellular signal bandwidth;

a second cellular signal strength;

a second cellular signal to noise ratio;

a second cellular data package loss rate;

a second cellular signal latency;

a second cellular signal round-trip time; or a second cellular signal bit rate.

Clause 36. The method of Clause 30, wherein the AVCG information further comprises information associated with a network communication protocol, wherein the AVCG information associated with the network communication protocol comprises at least one of:

an indication indicating whether a Wireless Fidelity communication protocol is active;

an indication indicating whether a Bluetooth communication protocol is active; or an indication indicating whether a fifth-generation communication protocol is active.

Clause 37. A non-transitory computer-readable medium storing instructions that when executed by a processor cause the processor to:

access Autonomous Vehicle Communication Gateway (AVCG) information that comprise information associated with an AVCG manager, wherein the AVCG manager is a software resource configured to transition among states in which an autonomous vehicle operates in response to detecting a respective trigger event;

determine an autonomy status associated with the autonomous vehicle, wherein the autonomy status indicates that the autonomous vehicle is in an autonomous mode, a non-autonomous mode, or a parking mode;

detect a change in the autonomy status; and determine a cause of the change in the autonomy status, wherein determining the cause of the change in the autonomy status comprises:

accessing historical records of events that provide information about historical operations of the autonomous vehicle;

tracking back the historical records of events;

tracking back the AVCG information; and determining one or more particular events from among one or both of the historical records of events and the AVCG information that led to the change in the autonomy status.

Clause 38. The non-transitory computer-readable medium of Clause 37, wherein the change is an unexpected change, detecting the unexpected change in the autonomy status is in response to detecting that the autonomy status is changed without an explicit command to change the autonomy status.

Clause 39. The non-transitory computer-readable medium of Clause 37, wherein the change is an unexpected change, detecting the unexpected change in the autonomy status is in response to detecting an anomalous trajectory plan that takes the autonomous vehicle out of an Operational Design Domain (ODD) of the autonomous vehicle.

Clause 40. The non-transitory computer-readable medium of Clause 39, wherein the ODD indicates maneuvers that the autonomous vehicle is capable of performing autonomously.

Clause 41. The system of any of Clauses 1-7, wherein the processor is further configured to perform one or more operations of a method according to any of Clauses 8-14.

Clause 42. The system of any of Clauses 1-7, wherein the processor is further configured to perform one or more operations according to any of Clauses 15-20.

Clause 43. An apparatus comprising means for performing a method according to any of Clauses 8-14.

Clause 44. An apparatus comprising means for performing a method according to any of Clauses 15-20.

Clause 45. The non-transitory computer-readable medium of any of Clauses 15-20 storing instructions that when executed by the processor causes the processor to perform one or more operations of a method according to any of Clauses 8-14.

Clause 46. The system of any of Clauses 21-29, wherein the processor is further configured to perform one or more operations of a method according to any of Clauses 30-36.

Clause 47. The system of any of Clauses 21-29, wherein the processor is further configured to perform one or more operations according to any of Clauses 37-40.

Clause 48. An apparatus comprising means for performing a method according to any of Clauses 30-36.

Clause 49. An apparatus comprising means for performing a method according to any of Clauses 30-36.

Clause 50. The non-transitory computer-readable medium of any of Clauses 37-40 storing instructions that when executed by the processor causes the processor to perform one or more operations of a method according to any of Clauses 30-36.

The invention claimed is:

1. A system comprising:

a memory configured to store an indication of a particular time period associated with an initiation state, the particular time period indicating a time when the initiation state ends; and a gateway processor operably coupled to the memory, and configured to:

determine that an engine of an autonomous vehicle is turned on at a first timestamp;

in response to determining that the engine of the autonomous vehicle is turned on at the first timestamp:

cause the autonomous vehicle to operate in the initiation state, wherein:

during the initiation state, Autonomous Vehicle Communication Gateway (AVCG) configuration data is communicated to the autonomous vehicle; and the AVCG configuration data comprises a set of instructions to control operations of the autonomous vehicle;

determine that the particular time period has passed since the engine of the autonomous vehicle was turned on;

in response to determining that the particular time period has passed since the engine of the autonomous vehicle was turned on, cause the autonomous vehicle to operate in an active state;

while in the active state, execute at least one of the set of instructions;

determine that the engine of the autonomous vehicle is turned off at a second timestamp;

in response to determining that the engine of the autonomous vehicle is turned off at the second timestamp, cause the autonomous vehicle to operate in a timed-active state, wherein the timed-active state is associated with a timeout parameter, such that when the timeout parameter is reached, the timed-active state ends;

while in the timed-active state, communicate a message to an oversight server;

determine that the timeout parameter is reached;

in response to determining that the timeout parameter is reached, cause the autonomous vehicle to operate in a shutdown state; and while in the shutdown state, store a result of executing the at least one of the set of instructions in the memory.

2. The system of claim 1, wherein the gateway processor causes the autonomous vehicle to transition from the initiation state into the active state in response to determining that the particular time period has passed since the engine of the autonomous vehicle was turned on.

3. The system of claim 1, wherein the gateway processor causes the autonomous vehicle to transition from the active state into the timed-active state in response to determining that the engine of the autonomous vehicle is turned off.

4. The system of claim 1, wherein the gateway processor causes the autonomous vehicle to transition from the active state into the timed-active state in response to detecting that a trajectory determined for the autonomous vehicle is outside of an operation of the autonomous vehicle.

5. The system of claim 1, wherein the gateway processor causes the autonomous vehicle to transition from the timed-active state into the shutdown state in response to determining that the timeout parameter is reached.

6. The system of claim 1, wherein the set of instructions comprises an instruction that indicates to set a Quality of Service (QoS) to each network path based at least in part upon a priority level associated with each network path, such that:

the instruction indicates to set a first QoS to a first network path, wherein:

the first QoS is less than a threshold QoS;

the first network path is associated with a first priority level that is less than a threshold priority level; and the first network path is allocated to communicate a location of the autonomous vehicle.

7. The system of claim 6, wherein the instruction further indicates to set a second QoS to a second network path, wherein:

the second QoS is more than the threshold QoS;

the second network path is associated with a second priority level that is higher than the threshold priority level; and the second network path that is allocated to communicate sensor data that provides information about an environment ahead of the autonomous vehicle.

8. A method comprising:

determining that an engine of an autonomous vehicle is turned on at a first timestamp;

in response to determining that the engine of the autonomous vehicle is turned on at the first timestamp:

causing the autonomous vehicle to operate in an initiation state, wherein:

during the initiation state, Autonomous Vehicle Communication Gateway (AVCG) configuration data is communicated to the autonomous vehicle;

the AVCG configuration data comprises a set of instructions to control operations of the autonomous vehicle;

determining that a particular time period has passed since the engine of the autonomous vehicle was turned on, the particular time period indicating a time when the initiation state ends;

in response to determining that the particular time period has passed since the engine of the autonomous vehicle was turned on, causing the autonomous vehicle to operate in an active state;

while in the active state, executing at least one of the set of instructions;

determining that the engine of the autonomous vehicle is turned off at a second timestamp;

in response to determining that the engine of the autonomous vehicle is turned off at the second timestamp, causing the autonomous vehicle to operate in a timed-active state, wherein the timed-active state is associated with a timeout parameter, such that when the timeout parameter is reached, the timed-active state ends;

while in the timed-active state, communicating a message to an oversight server;

determining that the timeout parameter is reached;

in response to determining that the timeout parameter is reached, causing the autonomous vehicle to operate in a shutdown state; and while in the shutdown state, storing a result of executing the at least one of the set of instructions in a memory that is onboard the autonomous vehicle.

9. The method of claim 8, wherein:

the set of instructions comprises an instruction that indicates to select a particular network provider from among at least two network providers to use for data communications, the at least two network providers comprising a first network provider and a second network provider; and the particular network provider is selected based at least in part upon a first cellular information associated with the first network provider and a second cellular information associated with the second network provider, such that in response to determining that the first cellular information comprises network conditions that satisfy network communication requirements, and that the second cellular information comprises network conditions that do not satisfy the network communication requirements, the first network provider is selected over the second network provider.

10. The method of claim 9, wherein the first cellular information comprises at least one of:

a first cellular signal bandwidth;

a first cellular signal strength;

a first cellular signal to noise ratio;

a first cellular data package loss rate;

a first cellular signal latency;

a first cellular signal round-trip time; or a first cellular signal bit rate.

11. The method of claim 9, wherein the second cellular information comprises at least one of:

a second cellular signal bandwidth;

a second cellular signal strength;

a second cellular signal to noise ratio;

a second cellular data package loss rate;

a second cellular signal latency;

a second cellular signal round-trip time; or a second cellular signal bit rate.

12. The method of claim 9, wherein the network communication requirements comprise at least one of:

a threshold network communication bandwidth;

a threshold signal strength;

a threshold signal to noise ratio;

a threshold data package loss rate;

a threshold signal latency;

a threshold signal round-trip time; or a threshold signal bit rate.

13. The method of claim 8, wherein the set of instructions comprises an instruction that indicates to cause a gateway processor that is onboard the autonomous vehicle to operate on a battery when the autonomous vehicle transitions into the timed-active state.

14. The method of claim 8, wherein the set of instructions comprises an instruction that indicates to communicate an acknowledgement message that indicates the autonomous vehicle is operational to the oversight server.

15. A non-transitory computer-readable medium storing instructions that when executed by a processor cause the processor to:

determine that an engine of an autonomous vehicle is turned on at a first timestamp;

in response to determining that the engine of the autonomous vehicle is turned on at the first timestamp:

cause the autonomous vehicle to operate in an initiation state, wherein:

during the initiation state, Autonomous Vehicle Communication Gateway (AVCG) configuration data is communicated to the autonomous vehicle;

the AVCG configuration data comprises a set of instructions to control operations of the autonomous vehicle;

determine that a particular time period has passed since the engine of the autonomous vehicle was turned on, the particular time period indicating a time when the initiation state ends;

in response to determining that the particular time period has passed since the engine of the autonomous vehicle was turned on, cause the autonomous vehicle to operate in an active state;

while in the active state, execute at least one of the set of instructions;

determine that the engine of the autonomous vehicle is turned off at a second timestamp;

in response to determining that the engine of the autonomous vehicle is turned off at the second timestamp, cause the autonomous vehicle to operate in a timed-active state, wherein the timed-active state is associated with a timeout parameter, such that when the timeout parameter is reached, the timed-active state ends;

while in the timed-active state, communicate a message to an oversight server;

determine that the timeout parameter is reached;

in response to determining that the timeout parameter is reached, cause the autonomous vehicle to operate in a shutdown state; and while in the shutdown state, store a result of executing the at least one of the set of instructions in a memory that is onboard the autonomous vehicle.

16. The non-transitory computer-readable medium of claim 15, wherein the set of instructions comprises an instruction that indicates to communicate a location data associated with the autonomous vehicle to the oversight server.

17. The non-transitory computer-readable medium of claim 15, wherein the set of instructions comprises an instruction that indicates to communicate a second message that indicates which network provider from among a set of network providers is selected for data communications to the oversight server.

18. The non-transitory computer-readable medium of claim 15, wherein the set of instructions comprises an instruction that indicates to communicate a second message that comprises a set of cellular information associated with a set of network providers and a network information associated with a remote server to the oversight server.

19. The non-transitory computer-readable medium of claim 15, wherein the message is a rescue message that comprises a location of the autonomous vehicle.

20. The non-transitory computer-readable medium of claim 15, wherein the message indicates to dispatch a driver to a location of the autonomous vehicle.

* * * * *